United States Patent
Le Léannec et al.

(10) Patent No.: US 12,063,376 B2
(45) Date of Patent: *Aug. 13, 2024

(54) LOCAL ILLUMINATION COMPENSATION FOR VIDEO ENCODING AND DECODING USING STORED PARAMETERS

(71) Applicant: InterDigital VC Holdings, Inc., Wilmington, DE (US)

(72) Inventors: Fabrice Le Léannec, Betton (FR); Tangi Poirier, Thorigné-Fouillard (FR); Ya Chen, Rennes (FR); Philippe Bordes, Laillé (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,695

(22) Filed: May 15, 2023

(65) Prior Publication Data
US 2023/0283787 A1    Sep. 7, 2023

Related U.S. Application Data

(63) Continuation of application No. 17/277,386, filed as application No. PCT/US2019/050510 on Sep. 11, 2019, now Pat. No. 11,689,727.

(30) Foreign Application Priority Data

Sep. 19, 2018 (EP) .................................... 18306215
Sep. 26, 2018 (EP) .................................... 18306261

(51) Int. Cl.
*H04N 19/00*   (2014.01)
*H04N 19/136*   (2014.01)
(Continued)

(52) U.S. Cl.
CPC ......... *H04N 19/186* (2014.11); *H04N 19/136* (2014.11); *H04N 19/176* (2014.11)

(58) Field of Classification Search
CPC .. H04N 19/186; H04N 19/136; H04N 19/176; H04N 19/157; H04N 19/61; H04N 19/96; H04N 19/70
See application file for complete search history.

(56) References Cited

U.S. PATENT DOCUMENTS 10,356,416 B2    7/2019  Liu et al.
2010/0091845 A1*  4/2010  Jeon ..................... H04N 19/105
                                              375/240.12
(Continued)

FOREIGN PATENT DOCUMENTS

CN          105379288 A       3/2016
CN          107690810 A       2/2018
(Continued)

OTHER PUBLICATIONS

Chen et al., "CE4.4.1: Generalized Bi-Prediction for Inter Coding", JVET- K0248-V1, Video Experts Team (JVET) of ITU-T SG 16 WP 3 and ISO/IEC JTC 1/SC 29/WG 11, 11th Meeting: Ljubljana, Slovenia, Jul. 10, 2018, 4 pages.

(Continued)

*Primary Examiner* — Frank F Huang
(74) *Attorney, Agent, or Firm* — Condo Roccia Koptiw LLP

(57) ABSTRACT

A Local illumination compensation system for video encoding and decoding uses memory for storing illumination compensation parameters and does not require access to reconstructed pixels of neighboring blocks. A set of illumination compensation parameters is stored in a dedicated buffer, which is of limited size, and which is decoupled from the coding unit level storage of information. The buffer contains a set of illumination compensation parameters, (Continued)

which may be, for example, computed (or determined in some other manner) on the fly or determined beforehand (for example for example obtained from the video signal or from a device).

38 Claims, 18 Drawing Sheets

(51) Int. Cl.
*H04N 19/176* (2014.01)
*H04N 19/186* (2014.01)

(56) References Cited

U.S. PATENT DOCUMENTS

| | | | | |
|---|---|---|---|---|
| 2013/0194386 | A1* | 8/2013 | Leontaris | H04N 19/187 348/43 |
| 2013/0243085 | A1* | 9/2013 | Kovliga | H04N 19/597 375/240.12 |
| 2014/0010305 | A1* | 1/2014 | Mironovich | H04N 19/105 375/240.16 |
| 2015/0023422 | A1 | 1/2015 | Zhang et al. | |
| 2016/0366415 | A1 | 12/2016 | Liu et al. | |
| 2018/0063531 | A1 | 3/2018 | Hu et al. | |
| 2021/0377517 | A1* | 12/2021 | Chen | H04N 19/105 |
| 2022/0038711 | A1* | 2/2022 | Leleannec | H04N 19/176 |

FOREIGN PATENT DOCUMENTS

| | | |
|---|---|---|
| WO | 2015/192372 A1 | 12/2015 |
| WO | 2016/200777 A1 | 12/2016 |
| WO | 2018/064492 A1 | 4/2018 |

OTHER PUBLICATIONS

Chen, Jianle et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, 7th Meeting: Torino, IT; Editors; JVET-G1001-V1, Jul. 13-21, 2017, 50 pages.
ITU-T, "High Efficiency Video Coding", H.265-v2, Series H: Audiovisual and Multimedia Systems, Infrastructure of Audiovisual Services—Coding of Moving Video, Oct. 2014, 540 pages.
ITU-T, "High Efficiency Video Coding", Recommendation ITU-T H.265, Series H: Audiovisual and Multimedia Systems, Infrastructure of Audiovisual Services—Coding of Moving Video, Apr. 2015, 636 pages.
Leleannec et al., "Asymmetric Coding Units in QTBT", JVET-D0064, Technicolor, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-8.
Tamse et al., "[CE4.6.3—Inter Prediction Refinement in JVET-J0024]", JVET-K0118-V1, Joint Video Experts Team (JVET) of ITU-T SG 16 WP 3 and ISO/IEC JTC 1/SC 29/I/VG 11, 11th Meeting: Ljubljana, Slovenia, Jul. 10, 2018, 3 pages.

* cited by examiner

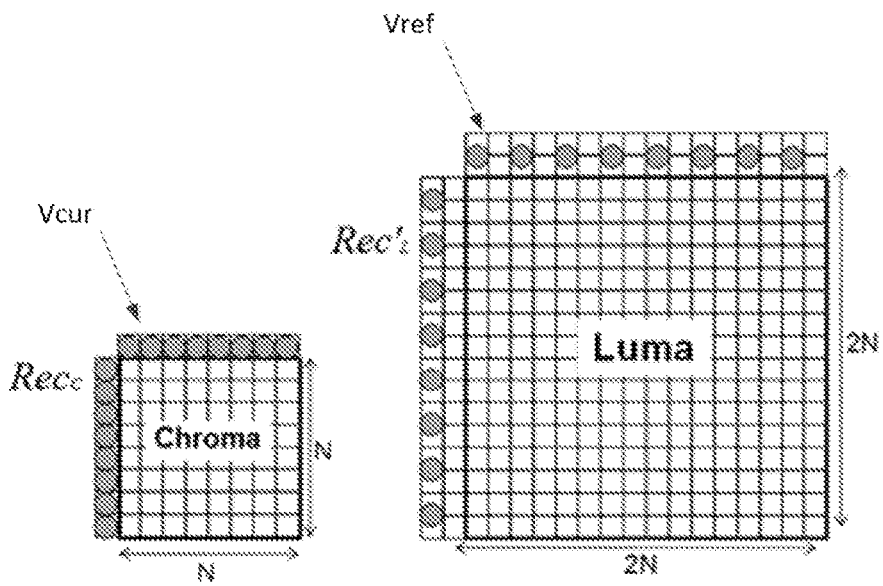
FIG. 5
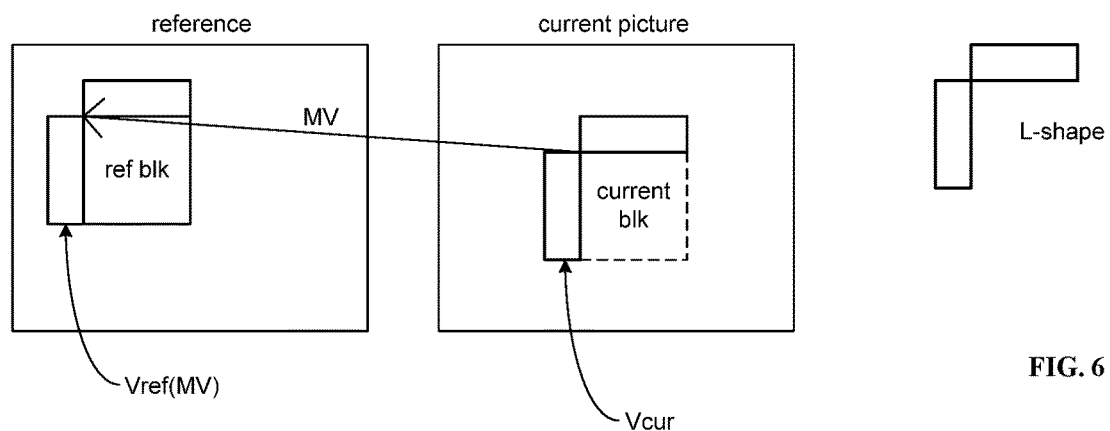
FIG. 6
FIG. 7
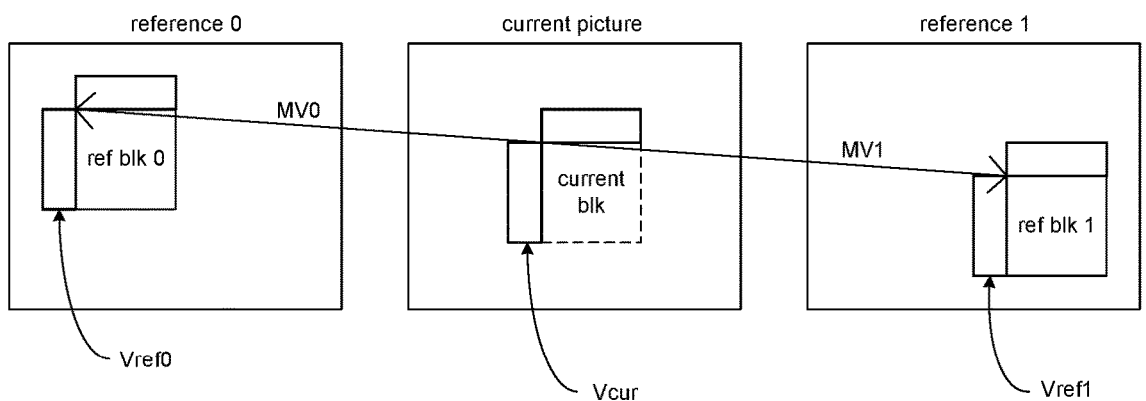

LIC parameters not calculated

LOCAL ILLUMINATION COMPENSATION FOR VIDEO ENCODING AND DECODING USING STORED PARAMETERS

This application is a Continuation Application of U.S. Non-Provisional application Ser. No. 17/277,386, filed Mar. 18, 2021; which is a 371 National Phase Application of PCT Application No. PCT/US2019/050510, filed Sep. 11, 2019; which claims the benefit of European Provisional Patent Application No. 18306215.7, filed Sep. 19, 2018, and European Provisional Patent Application No. 18306261.1, filed Sep. 26, 2018 the disclosures of which are incorporated herein by reference in their entirety.

TECHNICAL FIELD

At least one of the present embodiments generally relates to the field of video compression. At least one embodiment particularly aims at Local Illumination Compensation and more particularly to using a stored set of parameters for the Local Illumination Compensation.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

One or more of the present embodiments relates to a Local Illumination Compensation (LIC) system that uses stored illumination compensation (IC) parameters and does not require access to reconstructed pixels of neighboring blocks.

According to a first aspect of at least one embodiment, a video encoding method for encoding picture data of a block in a picture comprises encoding the picture data with signaling information comprising at least information representative of the use of a local illumination compensation function and an index of local illumination compensation parameters to be used.

According to a second aspect of at least one embodiment, a video decoding method for encoding picture data of a block in a picture comprises obtaining an index of local illumination compensation parameters to be used: and decoding the picture data and when the use of local illumination compensation function is signaled in signaling information corresponding to the block, use a local illumination compensation function with local illumination compensation parameters obtained according to the index.

According to a third aspect of at least one embodiment, an apparatus comprises an encoder for encoding picture data for at least one block in a picture or video wherein the encoder is configured to encode the picture data with signaling information comprising at least information representative of the use of local illumination compensation function and an index of the local illumination compensation parameters to be used.

According to a fourth aspect of at least one embodiment, an apparatus comprises a decoder for decoding picture data for at least one block in a picture or video wherein the decoder is configured to obtain an index of local illumination compensation parameters to be used from the buffer: and decode the picture data and when the use of local illumination compensation is signaled in signaling information corresponding to the block, use a local illumination compensation function with local illumination compensation parameters obtained from a buffer according to the index.

According to a fifth aspect of at least one embodiment, a computer program comprising program code instructions executable by a processor is presented, the computer program implementing the steps of a method according to at least the first or second aspect.

According to an eighth aspect of at least one embodiment, a computer program product which is stored on a non-transitory computer readable medium and comprises program code instructions executable by a processor is presented, the computer program product implementing the steps of a method according to at least the first or second aspect.

BRIEF DESCRIPTION OF THE DRAWINGS

FIG. 5 illustrates samples used for reconstruction of a block of picture in Inter mode.

FIG. 6 illustrates the motion vector between the current block and the reference block.

FIG. 7 illustrates an example of Bi-Prediction using two references.

DETAILED DESCRIPTION

Figure 1:
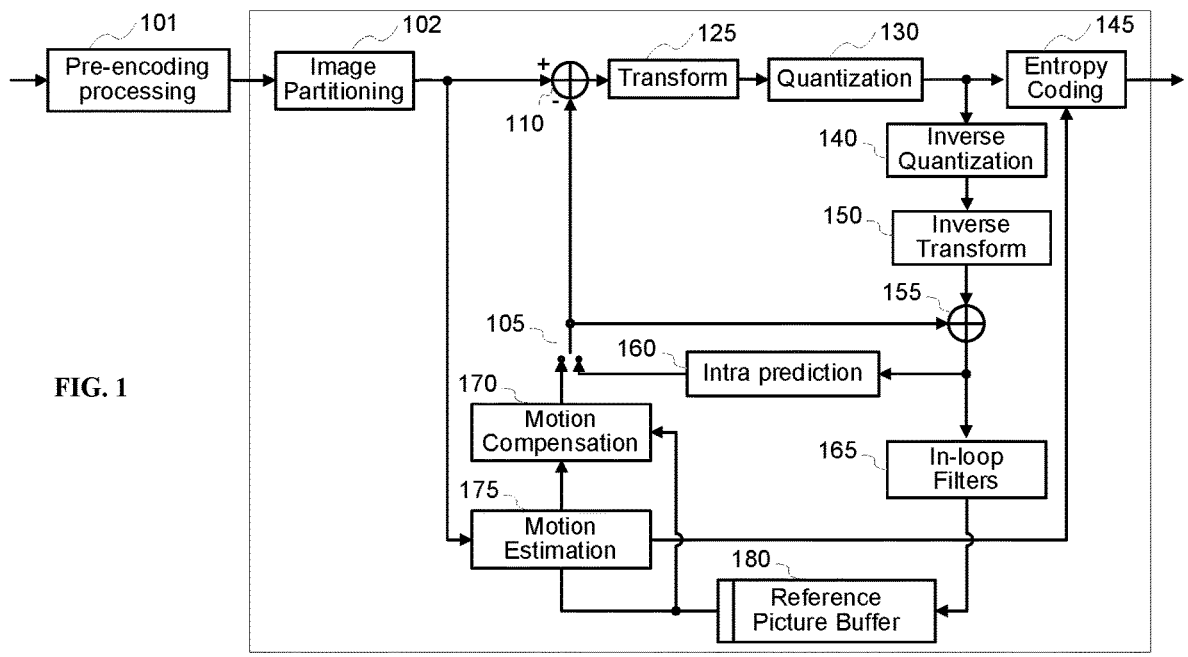
FIG. 1 illustrates a block diagram of an example of video encoder 100, such as a High Efficiency Video Coding (HEVC) encoder.

Various embodiments relate to a LIC system that uses memory for storing illumination compensation (IC) parameters and does not require access to reconstructed pixels of neighboring blocks. In at least one of the embodiments, a set of LIC parameters is stored in a dedicated buffer, which is of limited size, and which is decoupled from the coding unit level storage of information. The buffer contains a set of LIC parameters, which may be, for example, computed (or determined in some other manner) on the fly by the decoder (and the encoder as well) or determined beforehand (for example obtained from the video signal or from a device such as an encoder).

With regards to the coding syntax of a coding unit (CU), a flag indicates the use of illumination compensation function for Coding Units where LIC can be applied. In addition, according to at least one embodiment, a LIC parameter index is signaled to indicate which LIC parameters, from the considered buffer or LIC parameter set, are used for a current CU. In the case of on-the-fly computed LIC parameters, the LIC parameter set of at least one embodiment consists of the LIC parameters associated with the right edge part of one or more previously coded CUs. Such parameters are computed or determined in some other manner according to a vertical right-hand sub-part of one or more coded/decoded CUs. The set of parameters gathers LIC parameters over a limited spatial height, typically equal to the height of a coding tree unit (CTU). In another embodiment, an additional buffer may also store the LIC parameters associated with a horizontal lower part of a coded/decoded CU inside the current CTU. Advantageously, this embodiment, combined with the previous one, may increase the coding efficiency at the cost of a limited memory load increase. Another form of on-the-fly LIC parameters computation may consist in computing the illumination change in a current CU being coded/decoded and storing the resulting LIC parameters in a First-In-First-Out (FIFO) buffer. This buffer serves as a LIC parameter set for one or more subsequent CUs in the considered slice. In at least one embodiment using this form of on-the-fly LIC parameter computer for LIC in a CU, an index indicating the LIC parameters used in the FIFO is signaled in the bit-stream. Additionally, this FIFO concept typically comes with a policy for updating/maintaining the LIC parameters contained in the FIFO, which is detailed later in this document. Another embodiment uses a set of LIC parameters determined beforehand. LIC parameters determined beforehand can be defined prior to the use of the application and may not change. LIC parameters determined beforehand can also be adjustable so that they can be changed and thus may be obtained before their use and updated during their use. In at least one embodiment an index signals the LIC parameters determined beforehand to be used during the temporal prediction, for at least one CU where the use of LIC is signaled as true.

Moreover, the present aspects, although describing principles related to particular drafts of VVC (Versatile Video Coding) or to HEVC (High Efficiency Video Coding) specifications, are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

FIG. 1 illustrates block diagram of an example of video encoder 100, such as a HEVC encoder. FIG. 1 may also illustrate an encoder in which improvements are made to the HEVC standard or an encoder employing technologies similar to HEVC, such as a JEM (Joint Exploration Model) encoder under development by JVET (Joint Video Exploration Team) for VVC.

Before being encoded, the video sequence can go through pre-encoding processing (101). This is for example performed by applying a color transform to the input color picture (for example, conversion from RGB 4:4:4 to YCbCr 4:2:0) or performing a remapping of the input picture components in order to get a signal distribution more resilient to compression (for instance using a histogram equalization of one of the color components). Metadata can be associated with the pre-processing and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (for example, luma, Y), and the "unit" includes the collocated blocks of all encoded color components (Y, Cb, Cr, or monochrome), syntax elements, and prediction data that are associated with the blocks (for example, motion vectors).

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the example of encoder 100, a picture is encoded by the encoder elements as described below: The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using different options. If the applicable mode is included in a constructed list of six most probable modes (MPM), the mode is signaled by an index in the MPM list. Otherwise, the mode is signaled by a fixed-length binarization of the mode index. The six most probable modes are derived from the intra prediction modes of the top and left neighboring blocks.

For an inter CU, the motion information (for example, motion vector and reference picture index) can be signaled in various methods, for example "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the CU syntax for AMVP.

The prediction residuals are then transformed (125) and quantized (130), including at least one embodiment for adapting the chroma quantization parameter described below. The transforms are generally based on separable transforms. For instance, a DCT transform is first applied in the horizontal direction, then in the vertical direction. In recent codecs such as the JEM, the transforms used in both directions may differ (for example, DCT in one direction, DST in the other one), which leads to a wide variety of 2D transforms, while in previous codecs, the variety of 2D transforms for a given block size is usually limited.

The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, that is, the residual is coded directly without the application of the transform or quantization process. In direct PCM coding, no prediction is applied, and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
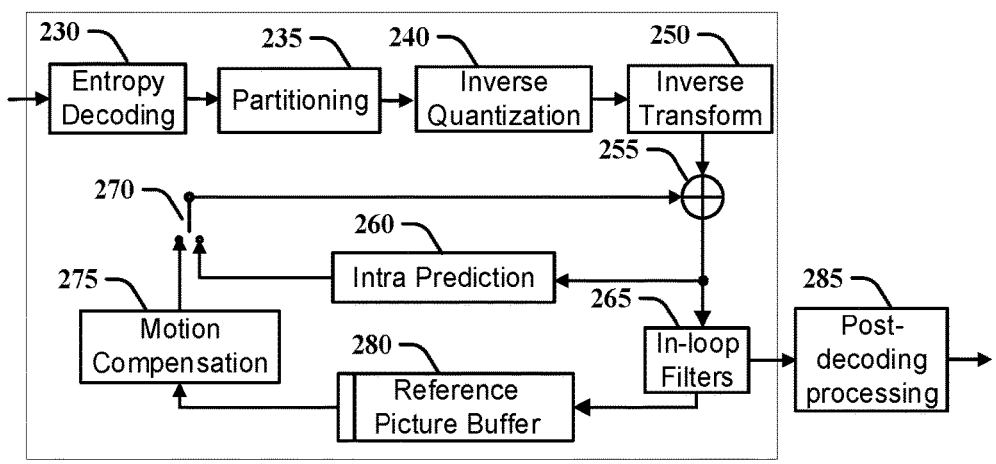
FIG. 2 illustrates a block diagram of an example of video decoder 200, such as an HEVC decoder.

FIG. 2 illustrates a block diagram of an example of video decoder 200, such as an HEVC decoder. In the example of decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a JEM decoder.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) including at least one embodiment for adapting the chroma quantization parameter described below and inverse transformed (250) to decode the prediction residuals.

Combining (255) the decoded prediction residuals and the predicted block, an image block is reconstructed. The predicted block may be obtained (270) from intra prediction (260) or motion-compensated prediction (that is, inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (for example conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Figure 3:
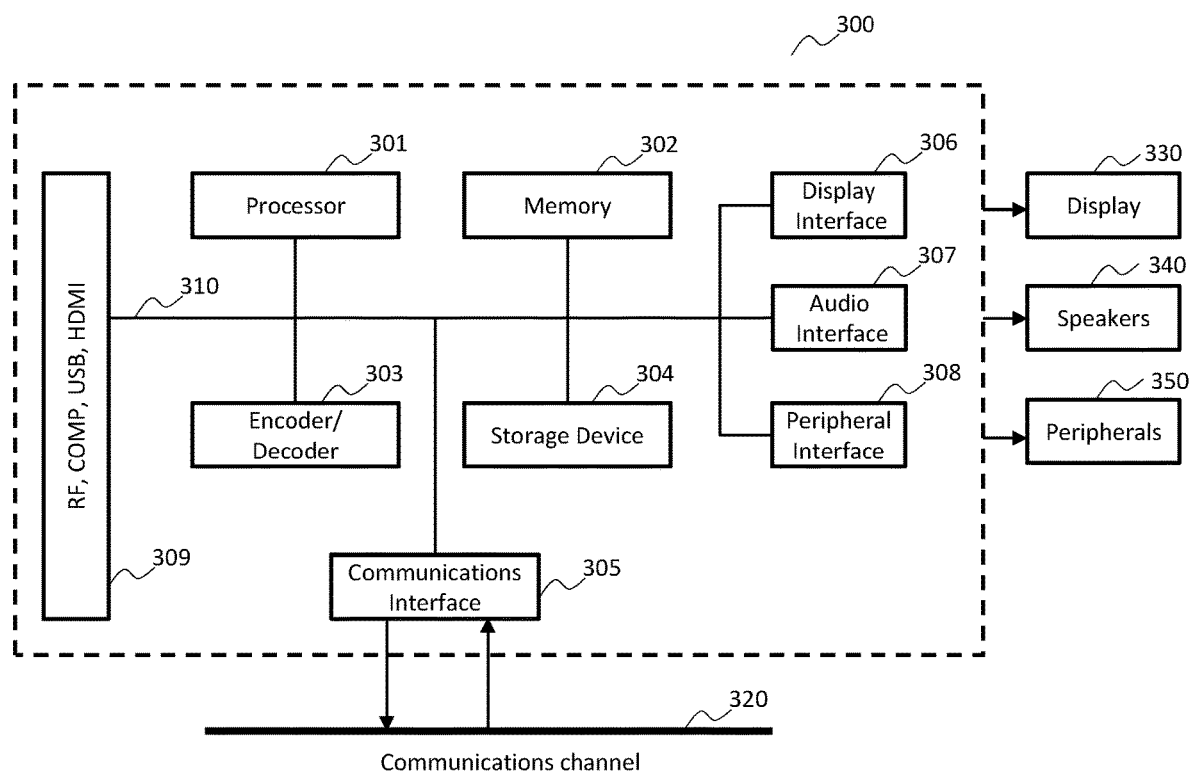
FIG. 3 illustrates a block diagram of an example of a system in which various aspects and embodiments are implemented.

FIG. 3 illustrates a block diagram of an example of a system in which various aspects and embodiments are implemented. System 300 can be embodied as a device including the various components described below and is configured to perform one or more of the aspects described in this application. Examples of such devices include, but are not limited to, various electronic devices such as personal computers, laptop computers, smartphones, tablet computers, digital multimedia set top boxes, digital television receivers, personal video recording systems, connected home appliances, encoders, transcoders, and servers. Elements of system 300, singly or in combination, can be embodied in a single integrated circuit, multiple integrated circuits, and/or discrete components. For example, in at least one embodiment, the processing and encoder/decoder elements of system 300 are distributed across multiple integrated circuits and/or discrete components. In various embodiments, the elements of system 300 are communicatively coupled through an internal bus 310. In various embodiments, the system 300 is communicatively coupled to other similar systems, or to other electronic devices, via, for example, a communications bus or through dedicated input and/or output ports. In various embodiments, the system 300 is configured to implement one or more of the aspects described in this document, such as the video encoder 100 and video decoder 200 described above and modified as described below.

The system 300 includes at least one processor 301 configured to execute instructions loaded therein for implementing, for example, the various aspects described in this document. Processor 301 can include embedded memory, input output interface, and various other circuitries as known in the art. The system 300 includes at least one memory 302 (e.g., a volatile memory device, and/or a non-volatile memory device). System 300 includes a storage device 304, which can include non-volatile memory and/or volatile memory, including, but not limited to, EEPROM, ROM, PROM, RAM, DRAM, SRAM, flash, magnetic disk drive, and/or optical disk drive. The storage device 304 can include an internal storage device, an attached storage device, and/or a network accessible storage device, as non-limiting examples.

System 300 includes an encoder/decoder module 303 configured, for example, to process data to provide an encoded video or decoded video, and the encoder/decoder module 303 can include its own processor and memory. The encoder/decoder module 303 represents module(s) that can be included in a device to perform the encoding and/or decoding functions. As is known, a device can include one or both of the encoding and decoding modules. Additionally, encoder/decoder module 303 can be implemented as a separate element of system 300 or can be incorporated within processor 301 as a combination of hardware and software as known to those skilled in the art.

Program code to be loaded onto processor 301 or encoder/decoder 303 to perform the various aspects described in this document can be stored in storage device 304 and subsequently loaded onto memory 302 for execution by processor 301. In accordance with various embodiments, one or more of processor 301, memory 302, storage device 304, and encoder/decoder module 303 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 301 and/or the encoder/decoder module 303 is used to store instructions and to provide working memory for processing that is needed during encoding or decoding. In other embodiments, however, a memory external to the processing device (for example, the processing device can be either the processor 301 or the encoder/decoder module 303) is used for one or more of these functions.

The external memory can be the memory 302 and/or the storage device 304, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 300 can be provided through various input devices as indicated in block 309. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 309 have associated respective input processing elements as known in the art. For example, the RF portion can be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 300 to other electronic devices across USB and/or HDMI connections. It is to be understood that various aspects of input processing, for example, Reed-Solomon error correction, can be implemented, for example, within a separate input processing integrated circuit or within processor 301 as necessary. Similarly, aspects of USB or HDMI interface processing can be implemented within separate interface integrated circuits or within processor 301 as necessary. The demodulated, error corrected, and demultiplexed stream is provided to various processing elements, including, for example, processor 301, and encoder/decoder 303 operating in combination with the memory and storage elements to process the data stream as necessary for presentation on an output device.

Various elements of system 300 can be provided within an integrated housing. Within the integrated housing, the various elements can be interconnected and transmit data therebetween using suitable connection arrangement, for example, an internal bus as known in the art, including the I2C bus, wiring, and printed circuit boards.

The system 300 includes communication interface 305 that enables communication with other devices via communication channel 320. The communication interface 305 can include, but is not limited to, a transceiver configured to transmit and to receive data over communication channel 320. The communication interface 305 can include, but is not limited to, a modem or network card and the communication channel 320 can be implemented, for example, within a wired and/or a wireless medium.

Data is streamed to the system 300, in various embodiments, using a Wi-Fi network such as IEEE 802.11. The Wi-Fi signal of these embodiments is received over the communications channel 320 and the communications interface 305 which are adapted for Wi-Fi communications. The communications channel 320 of these embodiments is typically connected to an access point or router that provides access to outside networks including the Internet for allowing streaming applications and other over-the-top communications. Other embodiments provide streamed data to the system 300 using a set-top box that delivers the data over the HDMI connection of the input block 309. Still other embodiments provide streamed data to the system 300 using the RF connection of the input block 309.

The system 300 can provide an output signal to various output devices, including a display 330, speakers 340, and other peripheral devices 350. The other peripheral devices 350 include, in various examples of embodiments, one or more of a stand-alone DVR, a disk player, a stereo system, a lighting system, and other devices that provide a function based on the output of the system 300. In various embodiments, control signals are communicated between the system 300 and the display 330, speakers 340, or other peripheral devices 350 using signaling such as AV.Link, CEC, or other communications protocols that enable device-to-device control with or without user intervention. The output devices can be communicatively coupled to system 300 via dedicated connections through respective interfaces 306, 307, and 308. Alternatively, the output devices can be connected to system 300 using the communications channel 320 via the communications interface 305. The display 330 and speakers 340 can be integrated in a single unit with the other components of system 300 in an electronic device such as, for example, a television. In various embodiments, the display interface 306 includes a display driver, such as, for example, a timing controller (T Con) chip.

The display 330 and speaker 340 can alternatively be separate from one or more of the other components, for example, if the RF portion of input 309 is part of a separate set-top box. In various embodiments in which the display 330 and speakers 340 are external components, the output signal can be provided via dedicated output connections, including, for example, HDMI ports, USB ports, or COMP outputs. The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The embodiments can be carried out by computer software implemented by the processor 301 or by hardware, or by a combination of hardware and software. As a non-limiting example, the embodiments can be implemented by one or more integrated circuits. The memory 302 can be of any type appropriate to the technical environment and can be implemented using any appropriate data storage technology, such as optical memory devices, magnetic memory devices, semiconductor-based memory devices, fixed memory, and removable memory, as non-limiting examples. The processor 301 can be of any type appropriate to the technical environment, and can encompass one or more of microprocessors, general purpose computers, special purpose computers, and processors based on a multi-core architecture, as non-limiting examples. Processors also include communication devices, such as, for example, computers, cell phones, portable/personal digital assistants ("PDAs"), and other devices that facilitate communication of information between end-users.

Figure 4A:
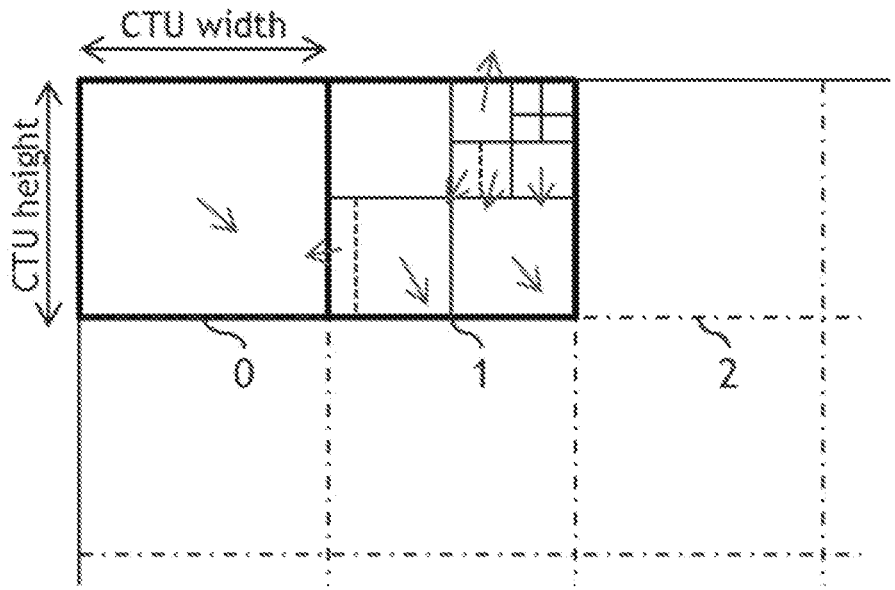
FIG. 4A illustrates an example of coding tree unit and coding tree in the compressed domain.
Figure 4B:
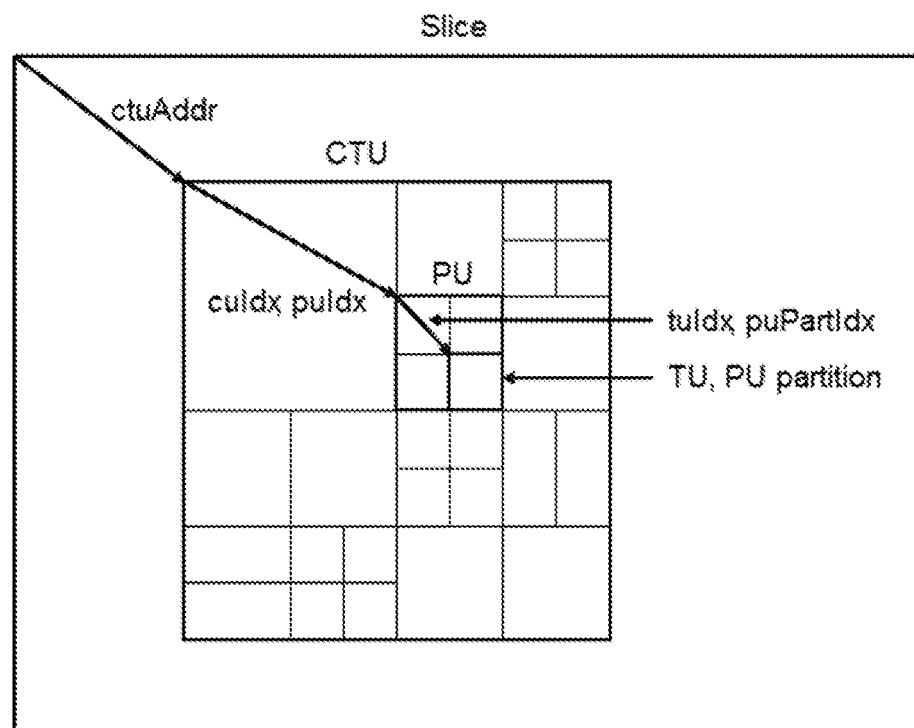
FIG. 4B illustrates an example of division of a CTU into coding units, prediction units and transform units.

FIGS. 4A and 4B illustrates an example of various structures used to represent an image. In the HEVC video compression standard, motion compensated temporal prediction is employed to exploit the redundancy that exists between successive pictures of a video. To do so, a motion vector is associated to each prediction unit (PU), which we introduce now. Each Coding Tree Unit (CTU) is represented by a Coding Tree in the compressed domain. This is a quad-tree division of the CTU as shown in FIG. 4A, where each leaf is called a Coding Unit (CU). Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, as shown in FIG. 4B. Exactly one Motion Vector is assigned to each PU in HEVC. This motion vector is used for motion compensated temporal prediction of the considered PU. Therefore, the motion model that links a predicted block and its reference block simply consists in a translation.

FIG. 5 illustrates samples used for reconstruction of a block of picture in Inter mode. In Inter mode, Local Illumination Compensation (LIC) allows correcting block prediction samples obtained via Motion Compensation (MC) by considering the spatial or temporal local illumination variation. It is based on a first order linear model of illumination changes, using a scaling factor a and an offset b. LIC parameters (a and b) are estimated by comparing a set of reconstructed samples surrounding the current block ("current blk"), located in a neighborhood Vcur, with a set of reconstructed samples, located in a neighborhood Vref (MV) of the reference block in the reference picture ("ref blk").

FIG. 6 illustrates the motion vector between the current block and the reference block. Typically, Vcur and Vref (MV) consist in samples located in the L-shape around (on the top, left and top-left side) the current block and reference block, respectively.

LIC parameters are chosen so as to minimize the mean square error difference between the samples in Vcur and the corrected samples in Vref(MV). Typically, the LIC model is linear: LIC(x)=a·x+b.

$$(a_i, b_i) = \underset{(a,b)}{\operatorname{argmin}}\left(\sum_{r \in Vcur, s \in Vref(MV)} (\operatorname{rec\_cur}(r) - a \cdot \operatorname{rec\_ref}(s) - b)^2\right)$$

where s and r correspond to pixel locations, respectively in Vcur and in Vref(MV).

In the following, pixel positions are represented either by a set (e.g. s or r) or corresponding coordinates (e.g. (x,y) or (i,j)).

FIG. 7 illustrates an example of Bi-Prediction using two references. In case of Bi-prediction, the LIC parameters (a0,b0) and (a1,b1) are derived independently of Vref0 (MV0) and Vref1(MV1) respectively. LIC is therefore based on the computation of a local distortion, which defined as follows:

$$dist = \sum_{r \in Vcur, s \in Vref} (\operatorname{rec\_cur}(r) - a \cdot \operatorname{rec\_ref}(s) - b)^2$$

Once the LIC parameters are obtained by the encoder or the decoder for the current CU, then the prediction pred (current_block) of current CU consists in the following (uni-directional prediction case):

pred(current_block)=a×ref_block+b

Where current_block is the current block to predict, pred(current_block) is the prediction of the current block, and ref_block is the reference block used for the temporal prediction of the current block.

Figure 8:
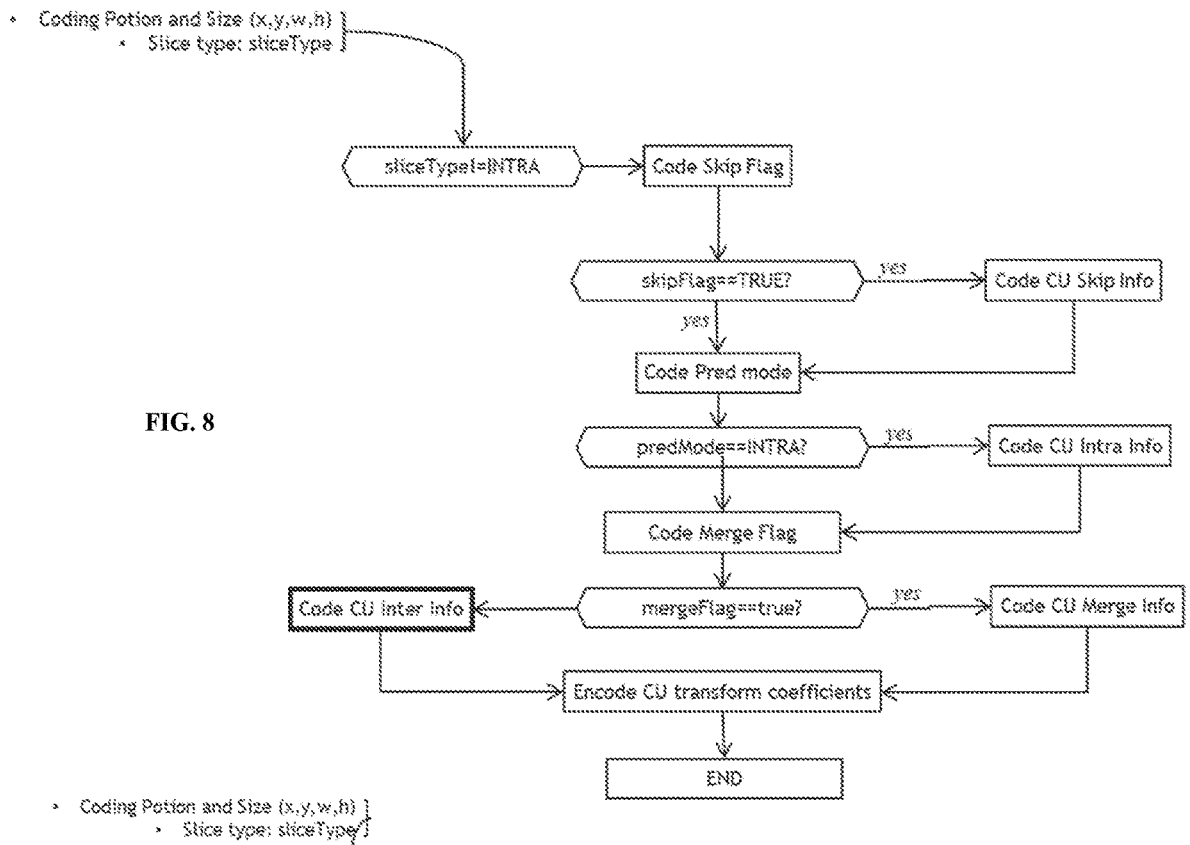
FIG. 8 illustrates an example of overall coding process to signal the coding parameters of a CU.

FIG. 8 illustrates an example of overall coding process to signal the coding parameters of a CU. At least one of the embodiments focuses on the regular INTER mode, also called AMVP (Adaptive Motion Vector Prediction).

Figure 9:
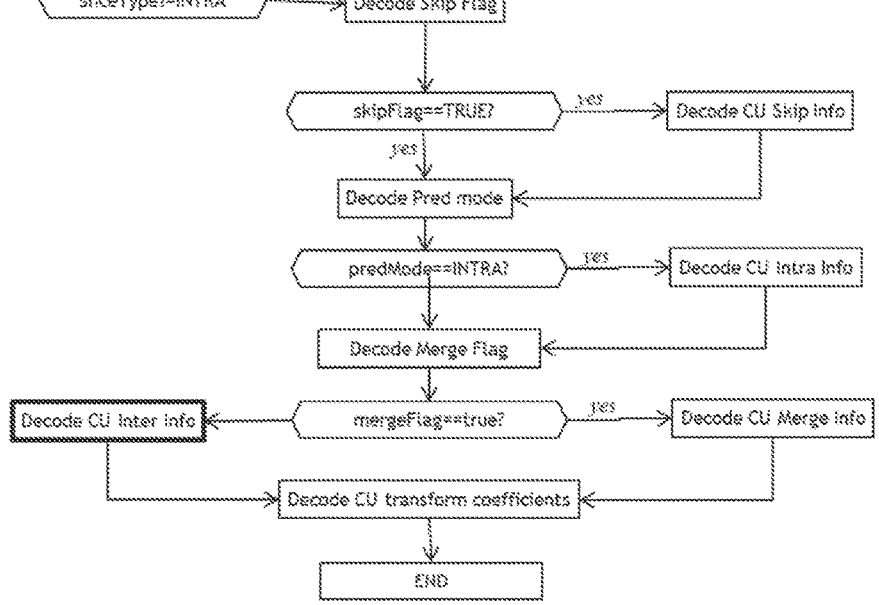
FIG. 9 illustrates an example of overall entropy decoding process of a CU.

FIG. 9 illustrates an example of overall entropy decoding process of a CU. The case of the AMVP INTER mode is emphasized. It happens in the case of an inter CU which does not employ the merge mode.

Figure 10:
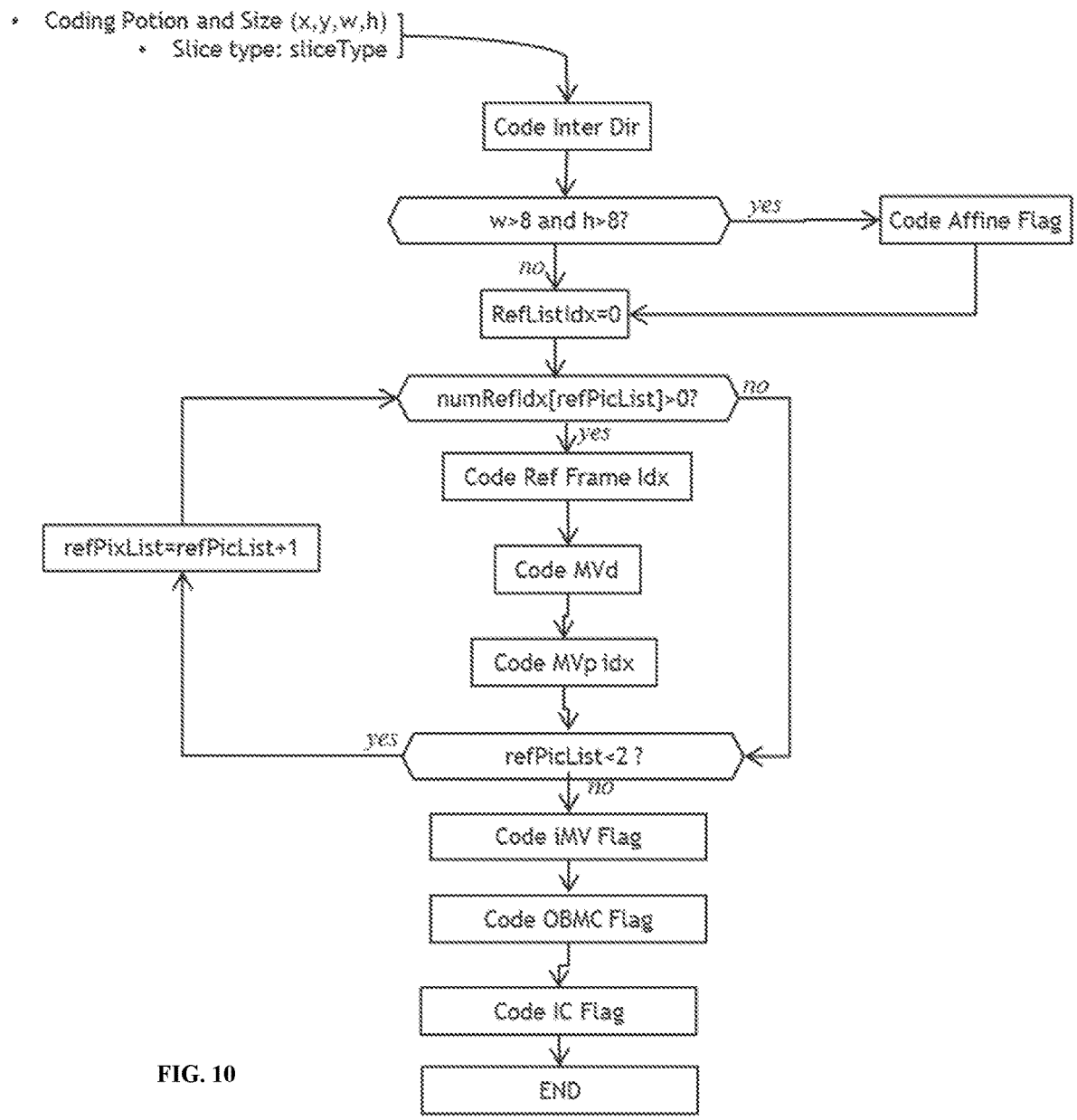
FIG. 10 illustrates an example of coding of the INTER prediction information associated to a CU in AMVP mode.

FIG. 10 illustrates an example of coding of the INTER prediction information associated to a CU in AMVP mode. In this example, a single IC flag is coded for each AMVP CU. Several motion fields are coded for an AMVP CU. One or two reference pictures are used to predict current INTER CU. For each reference picture used, a motion field is encoded under the form of a reference frame idx, an index that identifies the Motion Vector candidate used to predict current CU's motion vector, and the motion vector difference (MVd) between current CU's motion vector and the motion vector predictor used (MVP).

Finally, additional temporal prediction parameters may be encoded, which include the following:

The iMv flag indicates if the current CU's motion vectors are coded with a reduced accuracy level compared to the usual ¼ pel accuracy.

The OBMC flag indicates if the temporal prediction of current CU includes the known Overlapped Block Motion Compensation step.

The single IC flag associated to each INTER CU in AMVP mode.

Figure 11:
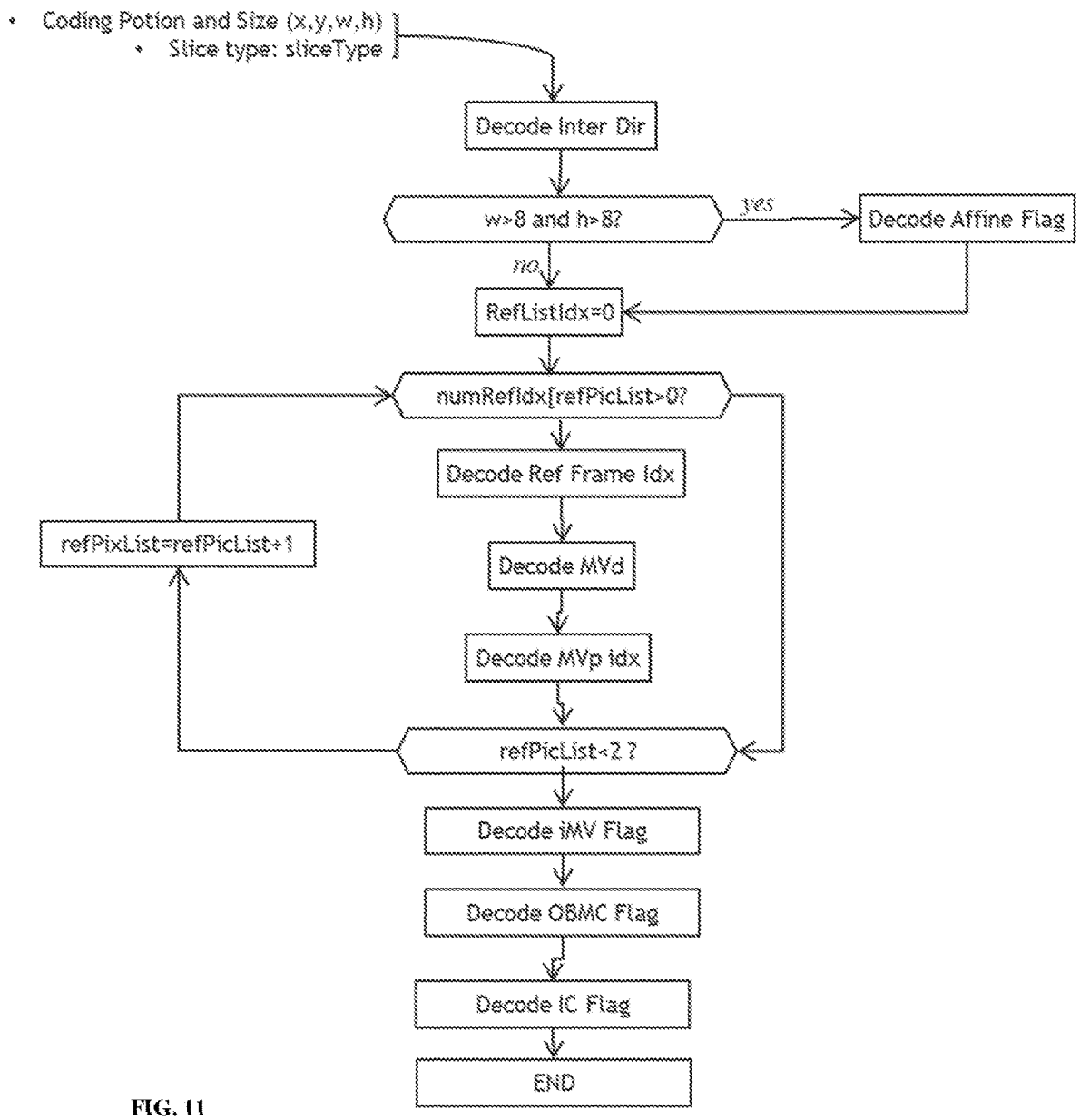
FIG. 11 illustrates an example of process used to decode the motion information associated to an AMVP Coding Unit.

FIG. 11 illustrates an example of process used to decode the motion information associated to an AMVP Coding Unit. This consists in decoding a motion field for each reference picture used to predict the current CU, following the reciprocal process of the coding process of FIG. 10. It is noted that once single Flag is decoded for each INTER CU in AMVP mode.

The principles of LIC as described above require the access to the reconstructed samples of already reconstructed top and left neighboring blocks. This aspect may be undesirable since it introduces some latency in the motion compensation process and potentially breaks conventional decoder pipeline architectures.

The present disclosure describes multiple embodiments that have been devised with the foregoing in mind.

Figure 12:
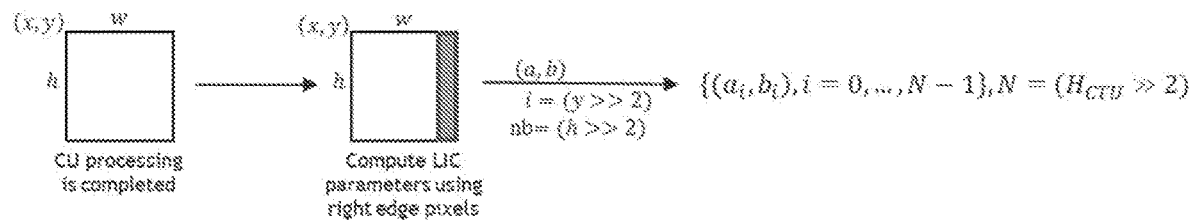
FIG. 12 illustrates a first example embodiment where LIC parameters are computed after a CU is reconstructed on a decoder and computed based on a right-hand sub-portion of the CU.

FIG. 12 illustrates a first example embodiment where LIC parameters are computed after a CU is reconstructed on a decoder and computed based on a right-hand sub-portion of the CU. In at least one example embodiment, the LIC parameters are computed based on a right-hand sub-portion of a considered decoded CU and stored in a buffer. In at least one embodiment, this buffer of LIC parameters consists in an array of LIC parameters (a,b) that are indexed as a function of the vertical position of the sub-block they refer to. In other words, it is proposed to store one tuple (a,b) of LIC parameter for each y-position of a sub-block inside a CTU. This leads to the storing of less tuples (a,b) overall than in the case where (a,b) parameters are stored for each CU of the picture.

Figure 13:
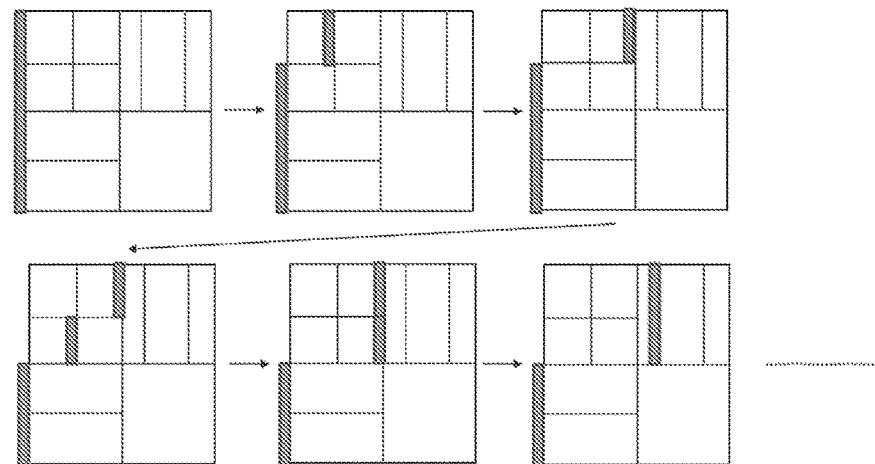
FIG. 13 illustrates the evolution of the LIC parameters buffer, as long as CUs inside a given CTU are being processed by the decoder when the embodiment of FIG. 12 is used.

FIG. 13 illustrates the evolution of the LIC parameters buffer, as long as CUs inside a given CTU are being processed by the decoder when the embodiment of FIG. 12 is used.

Indeed, at least one advantage of computing the LIC parameters based on the right-hand part of each CU is that it ensures that at any time, when decoding a coding unit, some LIC parameters corresponding to a picture area neighboring the current CU are available. The LIC parameters are then used to reconstruct the current CU. In FIG. 13, the grey parts represent all the areas over which LIC parameters have been computed and are currently stored in memory at a given stage of the decoding process. One sees that for each CU being decoded, some LIC parameters representative of the illumination change in the left neighboring area of the current CU are available and can potentially be used to apply LIC in the current CU. In other words, LIC parameters that are related to CUs already decoded are discarded and replaced by LIC parameters for further CUs. Note that on FIG. 13, before starting decoding the CUs contained in the current CTU, the LIC parameters contained in the buffer correspond to the LIC parameters previously computed in the right part of the CUS located on the right hand of the previous CTU. This is illustrated by the vertical grey rectangle on the left of the CTU at the first stage of the process of FIG. 13.

According to at least a variant embodiment, LIC may only be used for blocks which area is strictly higher than a certain value, for example 32. This corresponds to blocks at least as large as 8×8. In that case, it is possible to reduce the size of the buffer of LIC parameters by 2, by storing a pair of parameters (a,b) for each y-position of 8×8 sub-blocks of a CTU, which leads to 16 pairs of parameters (a,b) overall, if the CTU size is 128×128. Note that according to the variants presented above, the buffer size is 32 or 16 for the whole picture.

Figure 14:
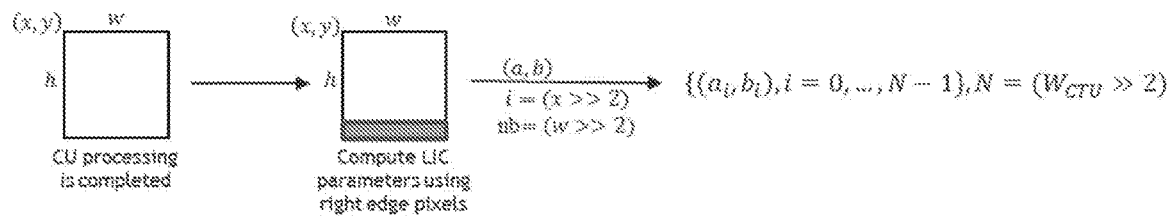
FIG. 14 illustrates a second example embodiment where LIC parameters are computed after a CU is reconstructed on a decoder and computed based on a lower horizontal lower horizontal sub-portion of the CU.

FIG. 14 illustrates a second example embodiment where LIC parameters are computed after a CU is reconstructed on a decoder and computed based on a lower horizontal lower horizontal sub-portion of the CU. In at least one example embodiment, the LIC parameters are computed over the lower horizontal part of the considered decoded CU and stored in a buffer. At the CU level, the process is close to the one of FIG. 12. This process is coupled with a memory buffer of (W_CTU/4) pairs of LIC parameters (a_i, b_i), where W_CTU represents the width of a CTU (typically 128).

Figure 15:
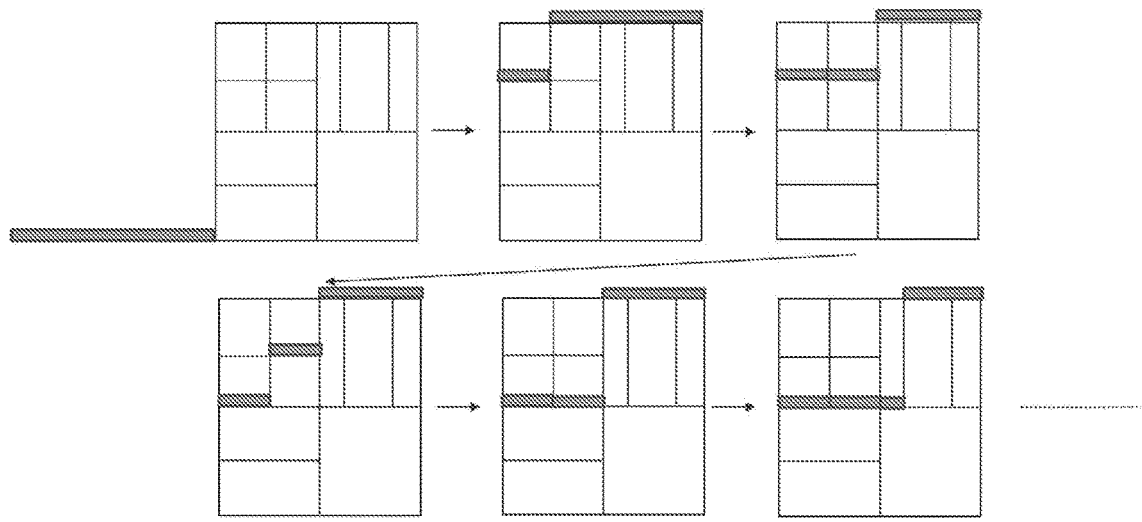
FIG. 15 illustrates the evolution of the LIC parameters buffer, as long as CUs inside a given CTU are being processed by the decoder when the embodiment of FIG. 14 is used.

FIG. 15 illustrates the evolution of the LIC parameters buffer, as long as CUs inside a given CTU are being processed by the decoder when the embodiment of FIG. 14 is used. A weakness of this embodiment, compared to the embodiment of FIG. 12, is that at some point, no LIC parameter corresponding to a spatial area neighboring the current CU is available. This occurs when switching from a CTU to the next CTU in the decoding process. However, in the other situations that occur more frequently, this embodiment proved to be helpful.

Figure 16:
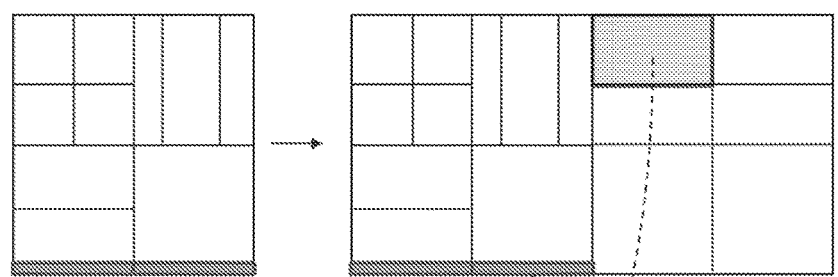
FIG. 16 illustrates a typical example of the switching from a CTU to the next CTU.

FIG. 16 illustrates a typical example of the switching from a CTU to the next CTU. In this figure, the light-grey CU in the second CTU makes use of LIC parameters computed on the lower parts of the preceding CTU.

In at least one variant embodiment, LIC may only be used for blocks which area is strictly higher than a certain value, for example 32. This corresponds to block at least as large as 8×8. In that case, it is possible to reduce the size of the buffer of LIC parameters by 2, by storing a pair of parameters (a,b) for each y-position of 8×8 sub-blocks of a CTU, which leads to 16 pairs of parameters (a,b) overall, if the CTU size is 128×128.

Figure 17:
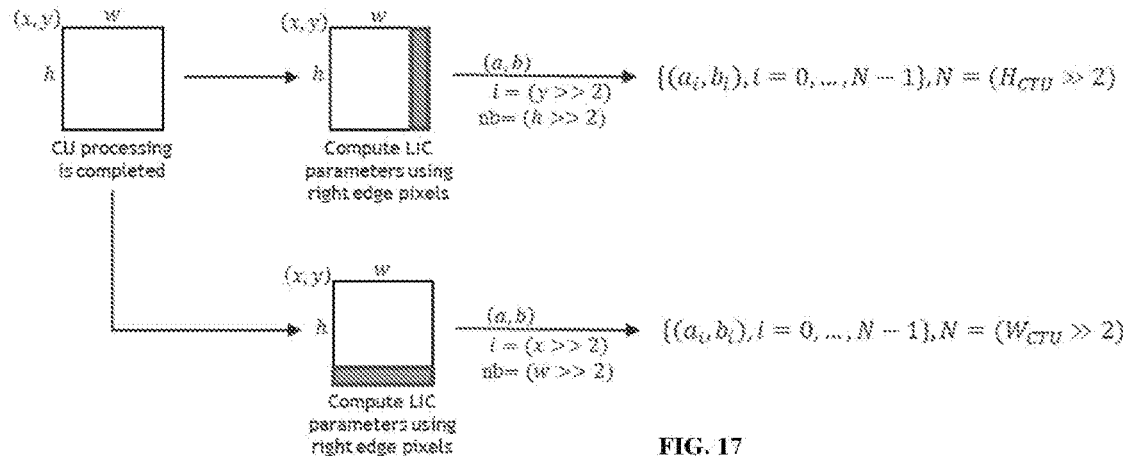
FIG. 17 illustrates a third example embodiment where LIC parameters are computed after a CU is reconstructed on a decoder and computed both over the vertical part on the right side of the CU, and then over the horizontal lower part of the CU.

FIG. 17 illustrates a third example embodiment where LIC parameters are computed after a CU is reconstructed on a decoder and computed both over the vertical part on the right side of the CU, and then over the horizontal lower part of the CU. This embodiment combines the two first embodiments. Therefore, two buffers, corresponding respectively to the vertical parts and horizontal parts, are being maintained during the decoding process. The sizes of these buffers are the same as those explained in the two preceding sections.

Figure 18:
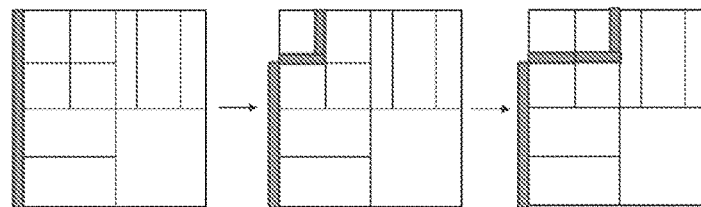
FIG. 18 shows the evolution of the LIC parameters contained in the two buffers, as long as CUs inside a given CTU are being processed by the decoder when the third embodiment is used.
Figure 18:
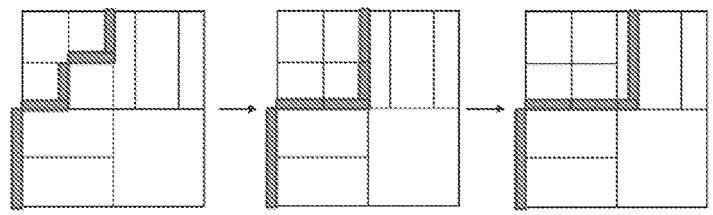

FIG. 18 shows the evolution of the LIC parameters contained in the two buffers, as long as CUs inside a given CTU are being processed by the decoder when the third embodiment is used. The grey parts represent all the areas over which LIC parameters have been computed and are currently stored in memory at a given stage of the decoding process. Note the horizontal part used to compute LIC parameters of previous CTU do not appear here to keep the figure as clear as possible.

Figure 19:
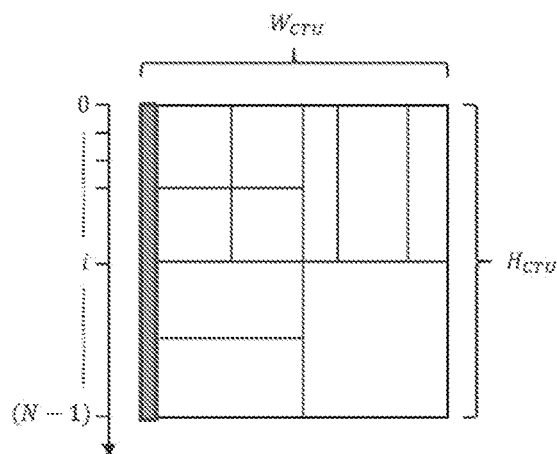
FIG. 19 illustrates an example of the LIC parameter memory storage as proposed in the first embodiment

FIG. 19 illustrates an example of the LIC parameter memory storage as proposed in the first embodiment. It shows the memory buffer used to store LIC parameters during the decoding process, represented as a grey rectangle.

Figure 20:
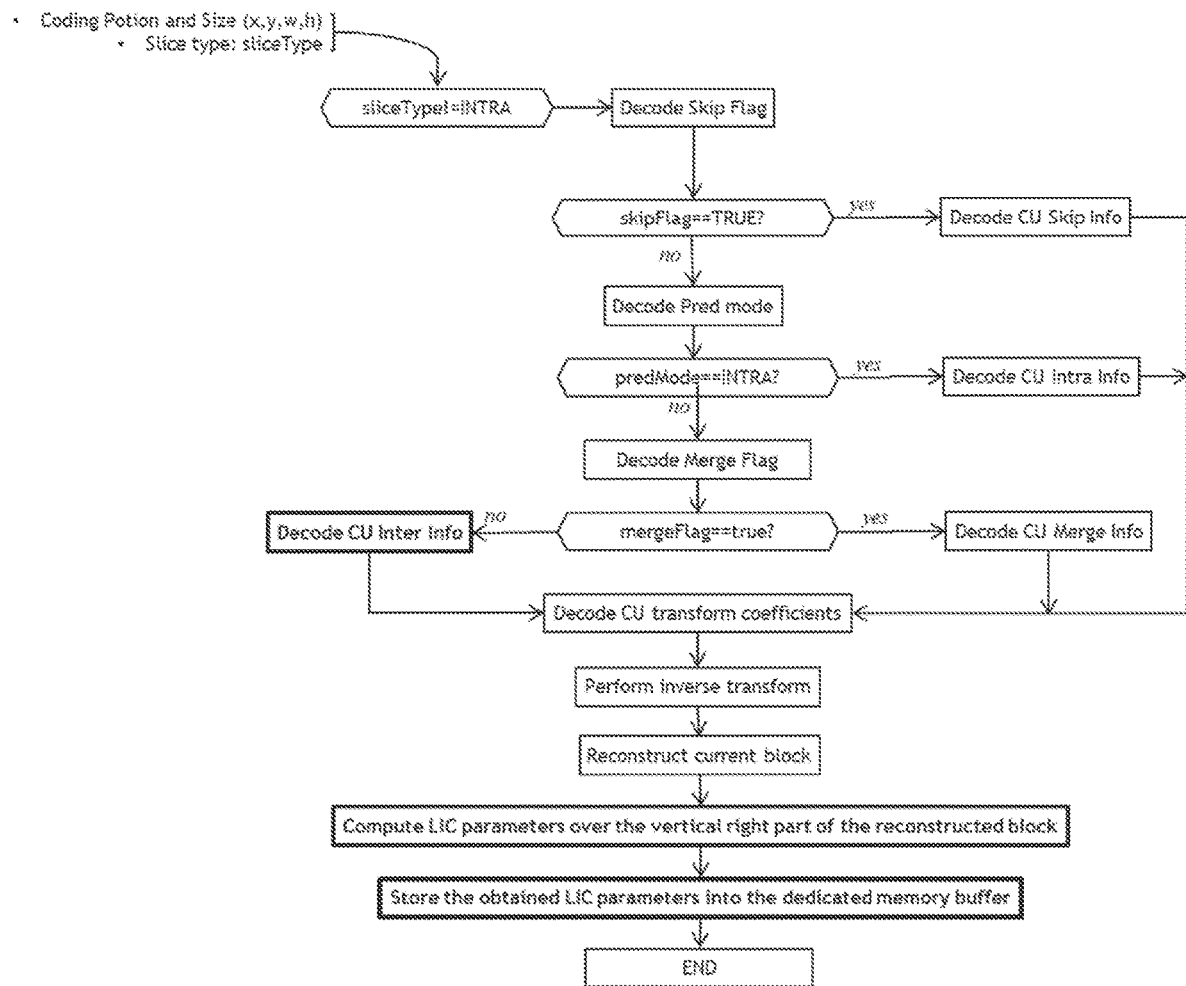
FIG. 20 illustrates an example of CU decoding process according to the first embodiment of this application.
Figure 21:
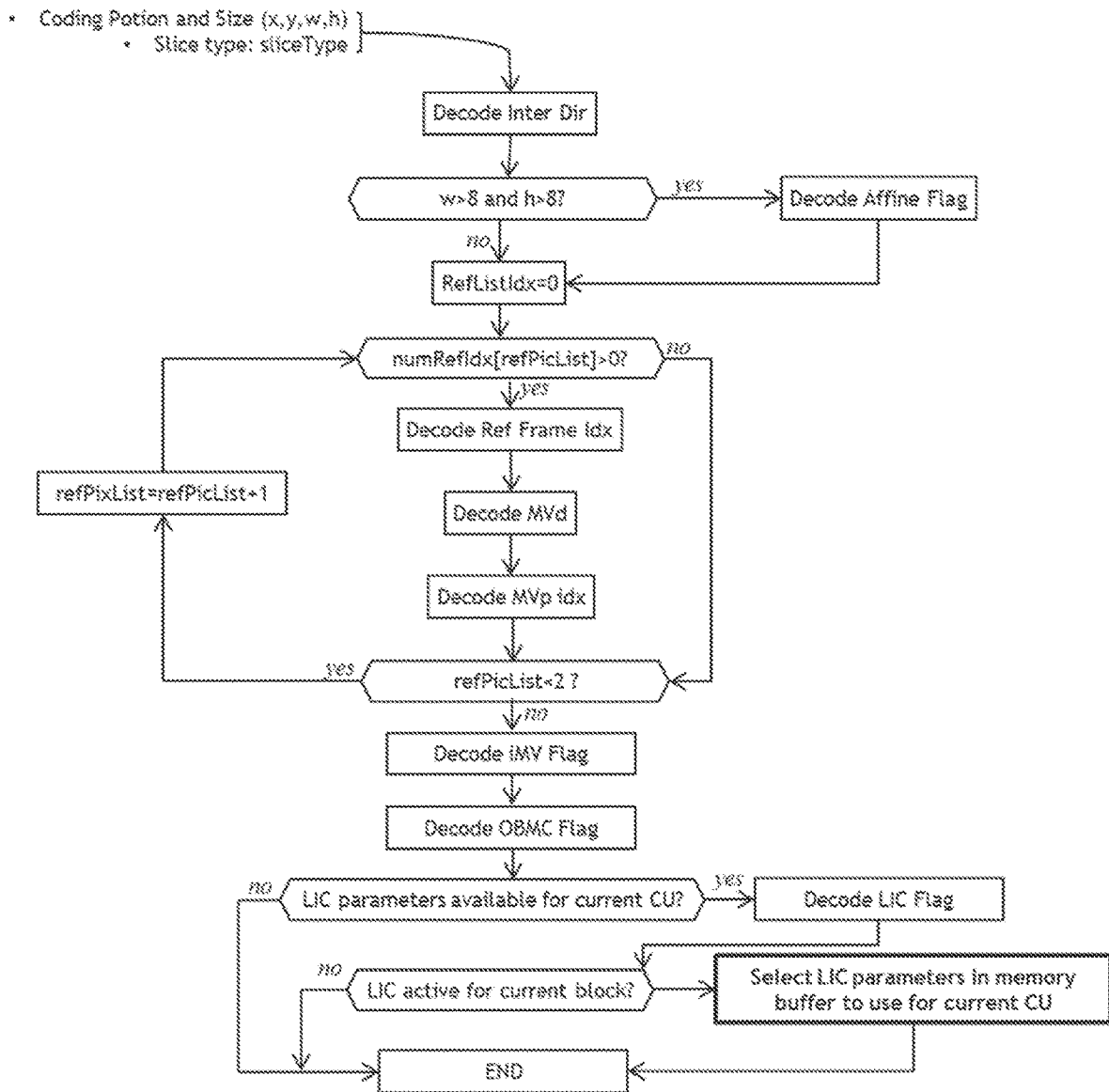
FIG. 21 illustrates an example process used to decode the inter prediction parameters of a CU coded in AMVP mode.

FIG. 20 illustrates an example of CU decoding process according to the first embodiment of this application. The decoding process is conventional except for the steps highlighted in bold. First the decoding of the inter prediction parameters is performed according to the detailed description of FIG. 21, given hereunder. Next the two other main modifications are the LIC parameters computation and LIC parameters storing steps that take place in the end of the CU decoding process of FIG. 20.

The computation of the LIC parameters (a,b) is performed conventionally as described above, with the difference that it is performed over the vertical right-hand part of the current CU. This steps then results in determining the LIC parameters (a,b) of a first order linear model to be used for the local illumination compensation. These parameters are then stored in a buffer, as shown in the last step of FIG. 20. As explained above, the buffer of LIC parameters simply consists in one array of tuples (a,b), indexed by the vertical spatial position the considered (a,b) parameters refer to, relative to the top of the considered CTU. Thus, the buffer can be represented as the following array:

$$\{(a_i,b_i), i=0,\ldots,N-1\}, N=(H_{CTU}>>2)$$

where $H_{CTU}$ is the height of the considered CTU, and for each index i comprised between 0 and (N−1) and the parameters $(a_i, b_i)$ represent the LIC parameters associated to a vertical spatial position i. Since the motion information is typically stored on the 4×4 block level in the current picture, one pair of LIC parameter is associated to each index i, which is associated to each vertical position, considering a 4-pixels based 1D grid over the CTU height. This is illustrated in FIG. 19 that shows the memory buffer used to store LIC parameters during the decoding process.

Thus, to store the LIC parameters (a,b) associated to a given CU, for each 4-sub-block based vertical position i contained in the current CU, the parameters (a_i, b_i) in the memory buffer are set equal to the values (a,b).

FIG. 21 illustrates an example process used to decode the inter prediction parameters of a CU coded in AMVP mode according to the proposed first embodiment. This process is the same as in FIG. 11, except for the newly introduced step for LIC parameters selection for the current CU, for a CU which LIC flag is equal to TRUE.

This step allows to determine which LIC parameters to use for current CU, among the LIC parameters stored in the dedicated memory buffer and proceeds as follows. The LIC parameters corresponding to the closest neighboring block with the same reference picture index as current CU are selected. The closest neighbor is for example the LIC parameters with the closest vertical position to the vertical position of the current CU, since the memory buffer is organized by vertical spatial position. Thus, this step includes a loop over the LIC parameters currently stored in the memory buffer, which goes from the closest vertical position of the current to the less close vertical position from the current CU vertical position. Here, and as an exemplary way of implementing this loop, the position of the current CU is defined as the position (x,y) of the top-left corner of the current CU. Hence the vertical position of the current CU is the y-coordinate of the top-left corner of the current CU. According to a variant, the starting position in the loop corresponds to the LIC parameters associated to the lowest vertical position. Hence, it corresponds to the LIC parameters issued from the coding/decoding of the coding unit containing the 4×4 sub-block located on the left of the bottom-left corner of the current CU. The loop then iterates from that starting point, towards the LIC parameters associated to the highest vertical position. According to a further variant, the loop iterates also over LIC parameters associated to vertical positions beyond the current CU horizontal boundaries, to make the process more likely to find some LIC parameters with the same reference picture index as current CU.

To get the reference picture index associated with a candidate pair of LIC parameters in the buffer, one retrieves the reference picture index of the last decoded CU at considered vertical position, i.e. the reconstructed CU that led to the computing and storing of the considered candidate LIC parameters. According to a variant, and to make the decoding process a bit simpler, the reference picture indices are stored together with the LIC parameters in the considered memory buffer.

If no neighboring block has the same reference picture index as the current block, then according to an embodiment, the LIC parameters referring to the closest position to that of current block may be used for current CU. Note however that priority is given to LIC parameters issued from decoded blocks with same reference picture index as current block, before considering candidate LIC parameters referring to block with reference picture index different from current block.

According to a variant, if no stored LIC parameter refer is issued from a block with same reference picture as current block, then LIC flag may be inferred to false.

Finally, note that in all proposed embodiments, LIC parameters corresponding to a trivial linear model (i.e. a=1, b=0) are not considered and not stored in the dedicated memory buffer. In this case, LIC is simply not used and signaled accordingly.

The detailed CU decoding process according to the second embodiment is similar to the above description for first embodiment. The difference is that instead of vertical regions used to compute LIC parameters, the horizontal lower sub-part of each reconstructed CU is used to compute and then store LIC parameters in the dedicated memory buffer. (FIGS. 14, 15, and 16). With respect to the selection/determination of the LIC parameters to use for a current CU, a similar process to the step "Select LIC parameters in memory buffer to use for current CU" is invoked. It thus consists in a loop over the LIC parameters stored in the considered memory buffer. Again, this loop may use a different starting point (hence also ending point) among the LIC parameters stored in the memory buffer. According to a first variant, the loop iterates from the LIC parameters correspond to the left horizontal CU position, i.e. LIC parameters associated to a horizontal position equal to the left position of the current CU. In this variant, the loop iterates from this position towards the stored LIC parameters which correspond to the horizontal position equal to that of the current CU's right corner. According to another variant, the order is reversed. This means the loop iterates from the right position (equal to the position of current CU's right corners) towards the left position (horizontal position equal to that of current CU's left corners). According to a further variant, the loop iterates also over LIC parameters associated to horizontal positions beyond the current CU boundaries, to make the process more likely to find some LIC parameters with the same reference picture index as current CU.

The third embodiment being a combination of the first and second embodiments, the LIC parameters computations and storing are identical to those of the first and second methods. A noticeable difference with the two first embodiments lies in selection of the LIC parameters to apply on current CU, given the two memory buffers (respectively storing vertical and horizontal regions based LIC parameters). Indeed, one pair of LIC parameters is a selection among those two buffers for current CU. A simple way to select it is to select one pair of LIC parameters in each buffer, as is done in the first and second embodiments. Next, among the two selected pairs of LIC parameters (a,b) the one corresponding to the closest position to the current CU is selected. If their respective distance to current CU position are the same, then priority is given to one orientation, for example the vertical one.

In at least a fourth embodiment, a new criterion for pruning LIC parameters candidates in the two memory buffers (vertical and horizontal) is used. An iteration loop is made on all LIC parameters (vertical, horizontal or both) stored in the memory buffer(s) such as to find all LIC parameters with the same reference picture index as current CU and finally select the LIC parameters calculated with the neighbor (N) which reconstructed motion vector values (MVx, MVy) are the closest to the motion vector of the current CU. The "closest" can be L1-norm (sum of absolute difference) or L2-norm based function for example.

In some conventional codecs, the motion vectors and reference index are stored in a motion-info buffer available for decoding other CUs. Such structure may be used to get the reference picture index and the motion vector values associated with LIC parameters stored in the memory.

In a variant embodiment, if the current CU is coded with merge mode, which indicates some of the current CU coding parameters have been derived (or directly merged) from one top (or left) neighboring CU (N), then the LIC parameters stored in the memory buffer(s) that were calculated with this top (or left) CU neighbor are selected for current CU.

In a variant of the fourth embodiment, the LIC-flag indicating whether LIC is applied for current CU can be inferred (from this neighbor (N)) or coded.

Figure 22:
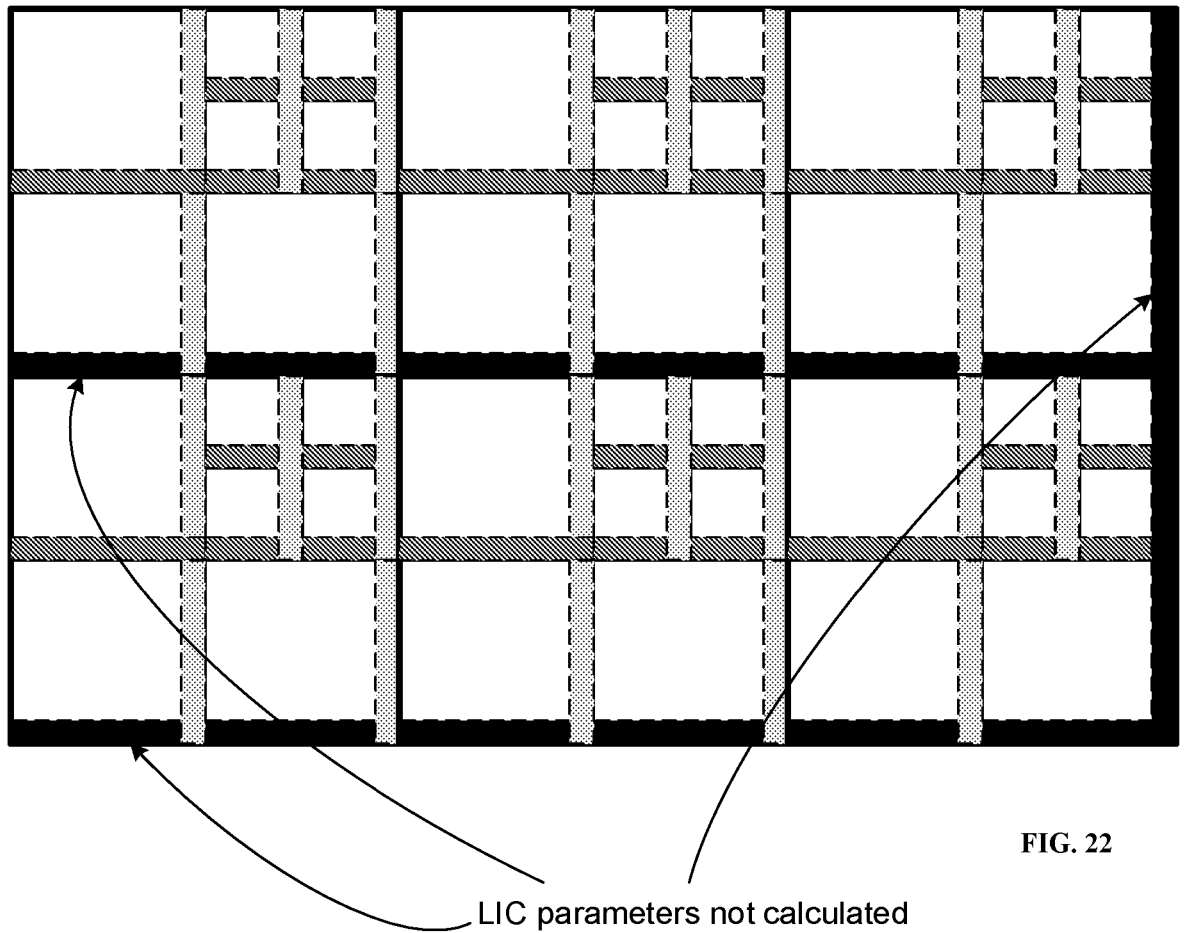
FIG. 22 illustrates a fifth example embodiment aiming at speeding up the encoding and decoding process.

FIG. 22 illustrates a fifth example embodiment aiming at speeding up the encoding and decoding process. In this embodiment, the LIC parameters for the partitions situated on the bottom of the current CTU or the right of the picture are not calculated because they will not be used to decode other CUs. These partitions are represented by black rectangles in FIG. 22.

In a variant embodiment, at the decoding stage, during the parsing of the coded parameters and the building of the CTU partition tree, a pre-fetched map indicating whether LIC parameters must be computed after reconstructing each CU can be constructed. For example, for the CUs coded in intra or CUs coded in inter with LIC flag explicitly coded (i.e. not inferred from reconstructed neighbor), this map will contain the LIC-flag as follows:

CU coded in INTRA: map-LIC-flag=false
CU coded in INTER with LIC-flag explicitly coded: map-LIC-flag=LIC-flag
CU coded in INTER with LIC-flag inferred: map-LIC-flag=true Next, after one current CUa reconstruction coded in INTER, if the map indicates all the right CUs (Cur) and below CUs (Cub) in the current CTU do not use LIC (map-LIC-flag=false), then the LIC parameters are not computed for current CUa.

Figure 23:
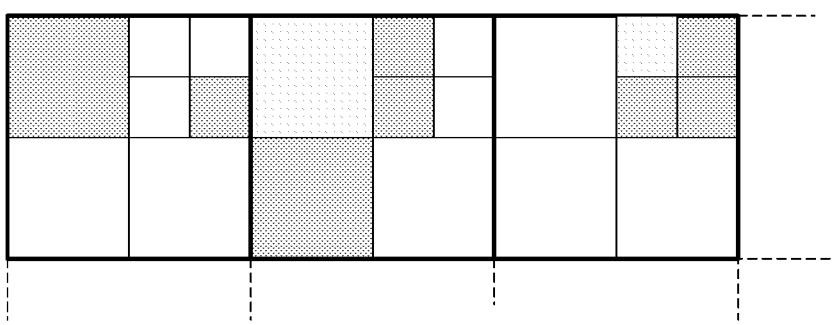
FIG. 23 illustrates an example variant embodiment where a pre-fetched map indicates if LIC parameters must be computed.

FIG. 23 illustrates an example variant embodiment where a pre-fetched map indicates if LIC parameters must be computed. In this figure, the partitions with white background use LIC and the ones with grey background does not use LIC, and for the remaining ones with cross-dashed background, the LIC use is inferred from reconstructed neighbor.

Figure 24:
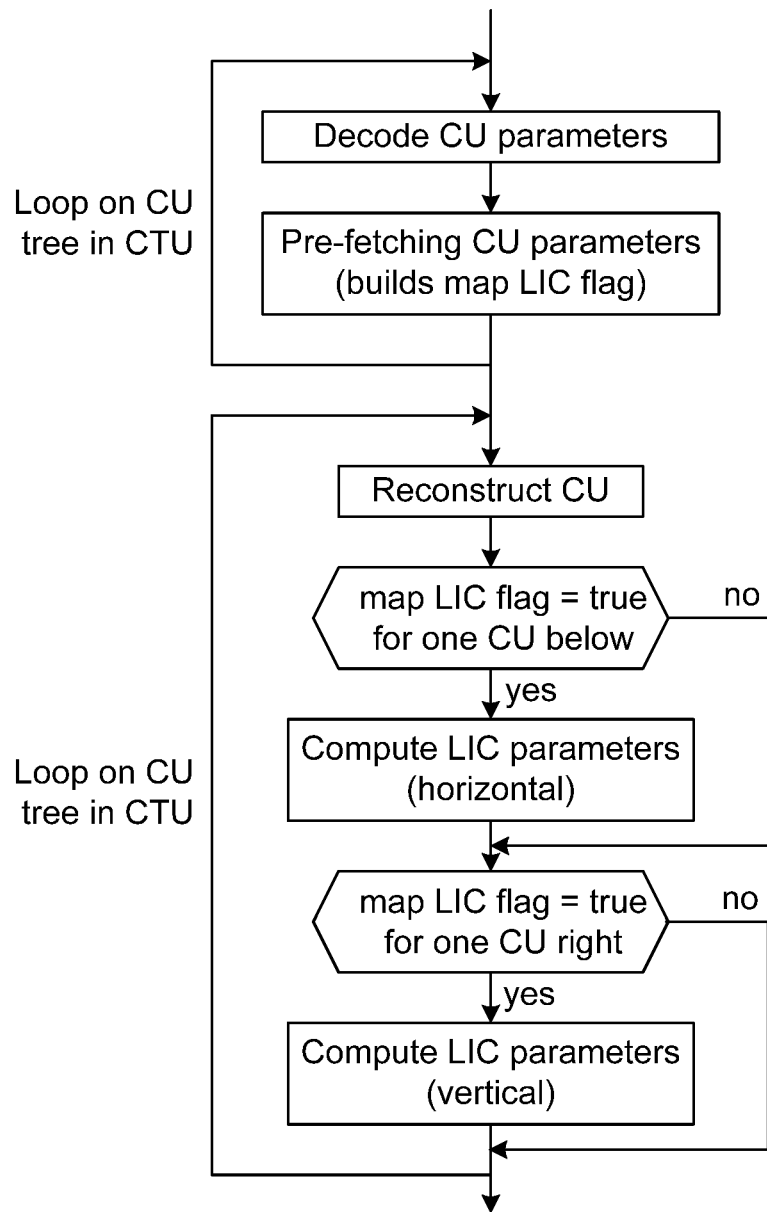
FIG. 24 illustrates the conditional computation of the LIC parameters using pre-fetching in CTU.

FIG. 24 illustrates the conditional computation of the LIC parameters using pre-fetching in CTU. In a first loop over CU tree in CTU, the CU parameters are decoded and a map of LIC flags is built is described above. In a second loop over CU tree in CTU, the CU is reconstructed and the LIC flag is checked to decide if not the LIC parameters should be computed.

Figure 25:
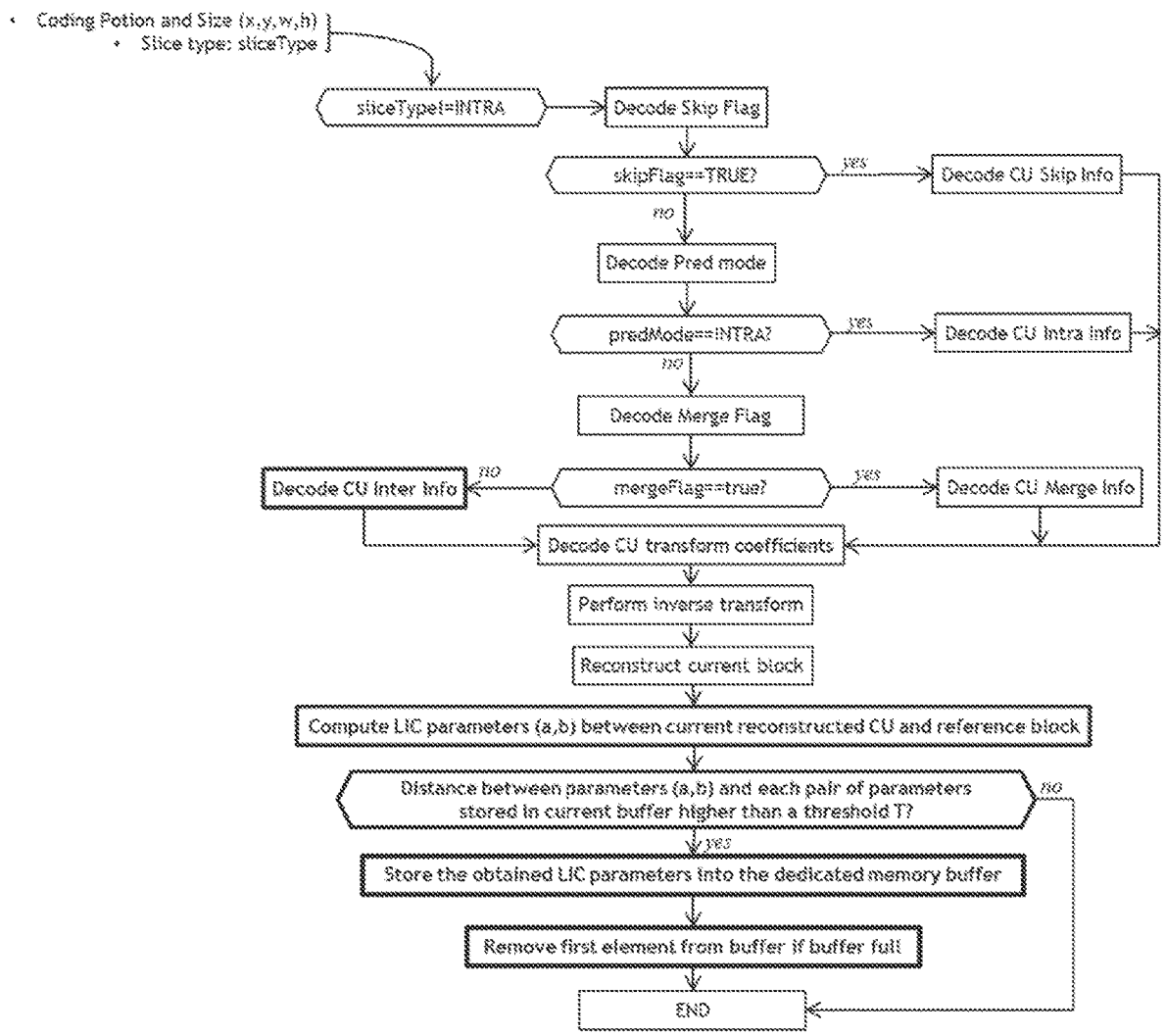
FIG. 25 illustrates the INTER CU decoding process, according to this sixth embodiment.

FIG. 25 illustrates a sixth example embodiment. This embodiment comprises the following characteristics:

- As for the 3 first embodiments, a memory buffer of limited size is used to store the LIC parameter that may be used to apply illumination change during the motion compensated temporal prediction of some CU later in the picture being decoded.
- As for the 3 first embodiments, the LIC parameters of each reconstructed CU are computed. They may be computed over the whole reconstructed CU, rather than on a right-hand or lower part of the CU as in the first 3 embodiments.
- The storing policy of the LIC parameters into the dedicated memory buffer is changed compared to previous embodiments: the LIC parameters are stored only if they bring some variety over the already stored parameters, to provide subsequent CUs with a good set of candidates LIC parameters for coding efficiency matters.
- The storing of some LIC parameters is coupled with the discarding of some LIC parameters to keep the memory buffer at a desired size.
- The LIC parameters used in the prediction of the current CU are identified through an index, which indicates which LIC parameters stored in the buffer are used in the current Coding Unit. This index is entropy-decoded from the bit-stream, if the LIC flag of the considered CU is equal to TRUE.

FIG. 25 illustrates the INTER CU decoding process, according to this sixth embodiment. In this embodiment, the LIC parameters of a CU (after it has been reconstructed) are computed similarly as above with the difference that the region over which LIC parameters (a,b) are computed is located inside the reconstructed CU. Once computed, the LIC parameters are compared to those already stored in the buffer. If the distance between newly computed parameters and already store parameters is detected as sufficient (for example larger than a threshold), for each stored pair of parameters, then the newly computed parameters are stored into the FIFO (first in first out) buffer. The buffer is of limited size, thus if it is full, then the first element that has been stored in the buffer is removed.

Figure 26:
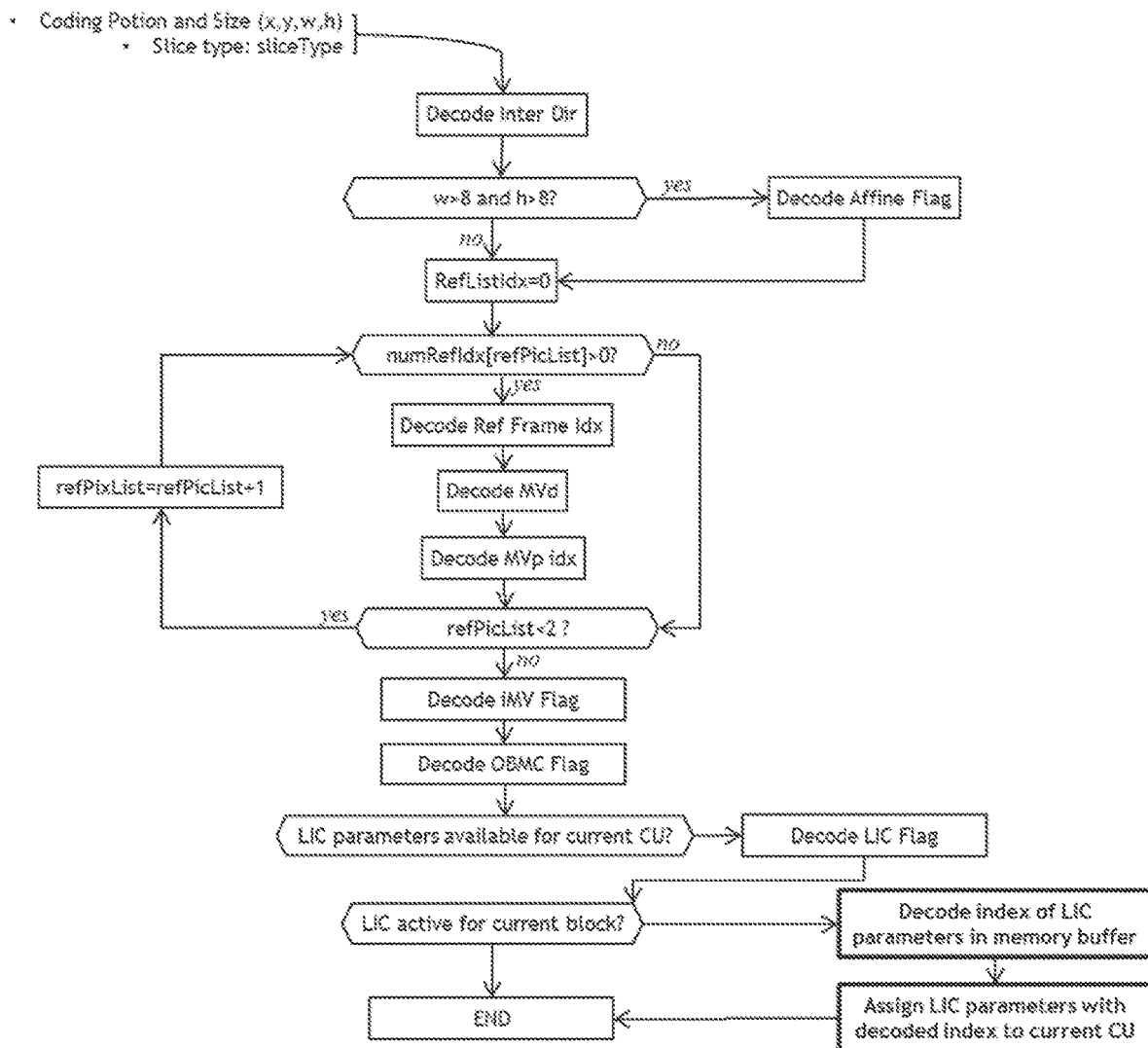
FIG. 26 illustrates an example of the INTER prediction parameters decoding process according to the sixth embodiment.

FIG. 26 illustrates an example of the INTER prediction parameters decoding process according to the sixth embodiment. This embodiment uses the computing/storing algorithm of FIG. 25. The process is the same as before except that it includes a decoding step of an additional syntax element, in case the LIC flag is active (for example flag is true) for current INTER CU. This syntax element corresponds to the index of the LIC parameters to use for current CU, during its motion compensated temporal prediction. The decoded index identifies the LIC parameters from the FIFO buffer to assign to current CU.

A seventh embodiment uses a set of LIC parameters determined beforehand. This includes the following characteristics:

- The use of LIC is again signaled by the CU-level LIC flag, as in preceding embodiments.
- LIC parameters are no more computed based on the picture content. They are determined beforehand instead.
- The LIC parameters determined beforehand are stored in a dedicated, limited, memory buffer as for preceding embodiments.
- An index is decoded from the bit-stream, for each CU where LIC is active. This index identifies the LIC parameters from the buffer, which are used during the INTER prediction of the current Coding Unit.

Note that this embodiment is analogous to the generalized bi-prediction concept but applied in the case of uni-directional temporal prediction. Basically, the uni-directional prediction takes the form of a linear function as follows: Pred(x)=a·ref+b. The specifity of this embodiment is that here, (a,b) is a pair of values selected among a set of predefined pair, and is identified through a transmitted pair index. Therefore, this embodiment is similar to the one of previous section. The difference is that the LIC parameters computation step of FIG. 25 is removed. The decoding of the index of LIC parameters in the memory buffer (FIG. 26) is kept as is. Moreover, the memory buffer of LIC parameters is not a FIFO as in previous embodiment but is a constant set of constant LIC parameters determined beforehand.

Figure 27:
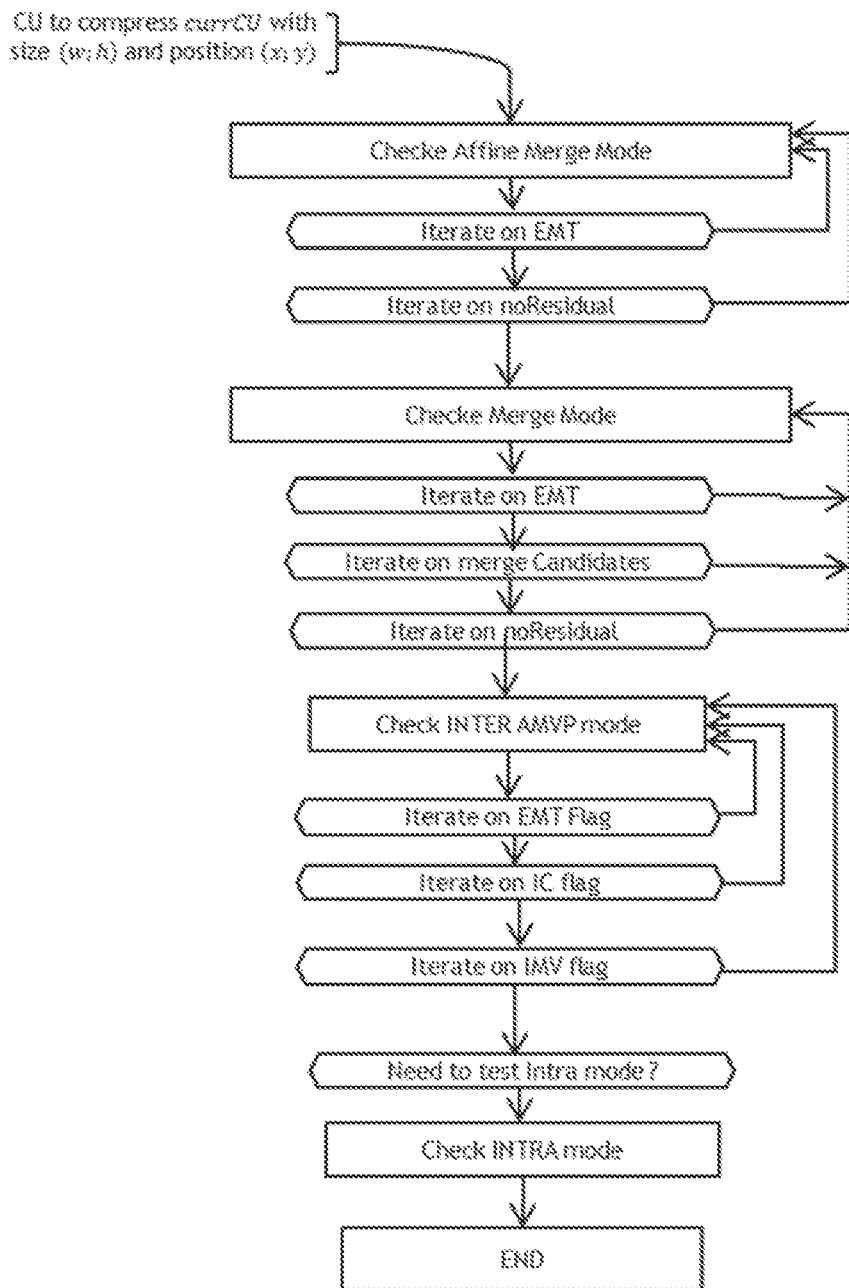
FIG. 27 illustrates an example embodiment of rate distortion optimized coding mode choice for a CU in a inter slice.

FIG. 27 illustrates an example embodiment of rate distortion optimized coding mode choice for a CU in a inter slice. Indeed, in addition to the coding of the flags related to illumination compensation, the rate distortion optimization of the AMVP coding mode is also modified. As illustrated in the figure, all possible INTER modes are evaluated and then INTRA mode is evaluated if the best found INTER mode is not sufficiently performant in coding the considered CU. The tested inter modes include for example the Affine Merge, the Merge mode, the FRUC merge mode and the INTER AMVP modes. In another embodiment, all available modes are tested. In the AMVP mode, the rate distortion search includes a loop over all coding parameters, including an iteration over the IC flag. Thus, each IC flag possible value is being evaluated from the rate distortion viewpoint for the current CU.

At least one embodiment of the application is implemented on the encoder side, for example in the device 100 or 300 as follows:

- As long as coding units of a CTU are being encoded, exactly the same memory buffer as on the decoder is maintained to store candidate LIC parameters for subsequent Coding Units to encode.
- In Merge mode, the same LIC flag and LIC parameters derivation processes as on the decoder side are performed. This involves:
- The propagation from the merge candidate CU being RD-evaluated, of the pair of LIC parameters in the dedicated memory buffer in the case of the five first embodiments, exactly in the same way as on the decoder side.
- The propagation from the merge candidate CU being RD-evaluated, of the LIC parameter index in the case of the sixth and seventh embodiments
- In AMVP mode, an RD choice between using LIC and not using LIC as illustrated by FIG. 24 is involved. This includes, when testing the LIC flag value equal to TRUE, the following.
- In the case of the five first embodiments, the same determination of the LIC parameters to use for current CU is performed as on the decoder side. This corresponds to the process described in FIG. 20.
- In the case of the sixth and seventh, a rate distortion optimization loop may be dedicated to the choice of the best LIC parameters to use for current CU, among the LIC parameters currently stored in the dedicated memory buffer. Thus, the index of the best LIC parameters candidates to use as the current CU's LIC, i.e. leading to the minimum rate distortion cost, is chosen. Then, if the encoder RD search process determines that LIC should be used for current CU, the LIC flag equal to TRUE and the best LIC parameters index found are being transmitted in the bit-stream.

Finally, each time a CU is being encoded according to any of the embodiments, the LIC parameters associated to that CU are being calculated exactly the same way as on the decoder side. This means a portion (lower part of right part) of the current reconstructed CU is used in the case of the five first embodiments. In the case of the sixth embodiment, the whole reconstructed CU may be used.

In an embodiment of the application, a modified LIC parameters computation, storing and use, in the case of INTER coding units that are coded in AMVP mode, is proposed, allowing propagation in the merge mode. This mainly implies the AMVP coding/decoding described previously. Indeed, the merge coding mode consists in deriving the motion information of a CU from a neighboring already coded/decoded CU, called a merge candidate. The best merge candidate is typically selected from the RD cost viewpoint on the encoder side, and a merge index, which identifies the selected merge candidate, is being transmitted in the bit-stream.

According to the present application, the IC flag associated to the merge candidate CU is being propagated to the current CU predicted in merge mode. This means the CU in the merge mode is also assigned an IC flag, equal to that of the merge candidate CU selected for the prediction of current CU's motion information.

With respect to LIC parameters, the current CU that is in merge mode also inherits the LIC parameters associated to the selected merge candidate.

The motion compensated temporal prediction of such merge CU thus includes the application of illumination change compensation, exactly the same way as for INTER AMVP Coding Units.

One specific aspect of this application is related to the case where a CU-level index is used to identify which stored LIC parameters are used in the temporal prediction of current CU. This concerns the sixth and seventh embodiments previously explained. If current CU is in merge mode, then it inherits the LIC parameters index of the selected merge candidates.

Another specific aspect concerns the CUs that are coded in inter, in merge mode, and employ bi-directional temporal prediction. Such CUs derive motion information that potentially comes from different candidates which use uni-directional LIC. In that case, classically LIC is not allowed in bi-directionally predicted CUs. Here, LIC may be activated in the case of the fifth embodiment that involves LIC parameters determined beforehand. As already stated, we also call this embodiment uni-directional generalized prediction. In the case where the two selected candidates employ generalized uni-directional prediction with the same parameters (a,b) determined beforehand, then the linear model using these (a,b) parameters is also applied in the bi-directional temporal prediction of current CU. Otherwise, if none of the merge candidate is employing generalized uni-directional prediction or both of them are using it but with different parameters, then no linear model is used in the bi-directional prediction of current CU.

Figure 28:
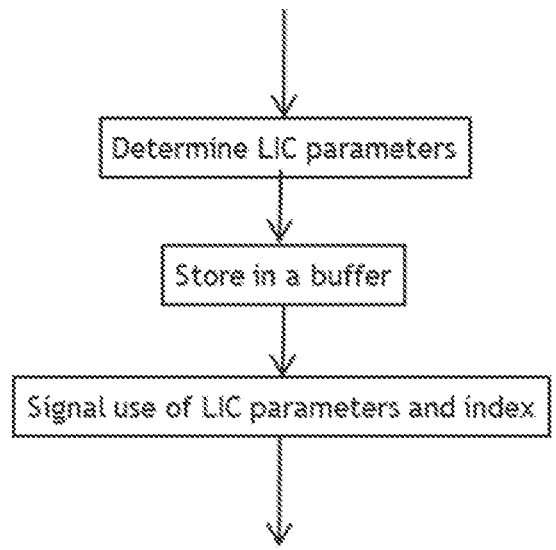
FIG. 28 describes a flowchart for the LIC parameters determining according to at least one embodiment of the application.

FIG. 28 describes a flowchart for the LIC parameters determining according to at least one embodiment of the application. In a first step, the LIC parameters are determined according to one of the embodiments mentioned above. In a second step, the LIC parameters are stored in a buffer according to one of the embodiments mentioned above. In a third step, the use of the LIC parameters and the index of the LIC parameters in the buffer are signaled. In at least one embodiment, this is done for example using some dedicated syntax embedded within the signal when the LIC parameters are determined prior to the content providing (e.g. at the encoder). In at least another embodiment, this is done for example using some internal variables when the LIC parameters are determined after the content accessing (e.g. at the decoder).

Figure 29:
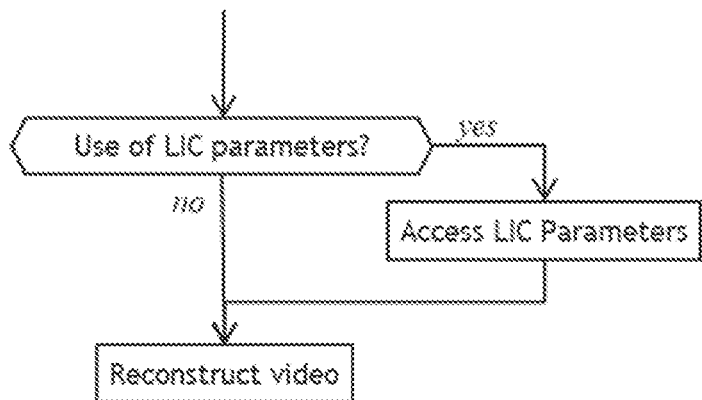
FIG. 29 describes a flowchart for the usage of LIC parameters according to at least one embodiment of the application.

FIG. 29 describes a flowchart for the usage of LIC parameters according to at least one embodiment of the application. In a first step, it is checked whether the LIC parameters should be used or not. One example of check is to detect the presence of appropriate signaling within the video content, for example under the form of a flag and an index. If the LIC Parameters are to be used, then these parameters are access, for example obtained from the buffer where they were stored and used to reconstruct the video, for example to reconstruct one coding unit of a coding tree unit by applying the LIC parameters to compensate for the change of illumination on that coding unit.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, the embodiments presented in FIG. 29.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, the embodiments of FIG. 29.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well. The aspects described and contemplated in this application can be implemented in many different forms. Figures FIG. 1, FIG. 2 and FIG. 3 above provide some embodiments, but other embodiments are contemplated, and the discussion of Figures does not limit the breadth of the implementations.

In the present application, the terms "reconstructed" and "decoded" may be used interchangeably, the terms "memory" and "buffer" may be used interchangeably, the terms "image", the terms "pixel" and "sample" may be used interchangeably, the terms "image," "picture" and "frame" may be used interchangeably, the terms "index" and "idx" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example regarding block sizes. The specific values are for example purposes and the aspects described are not limited to these specific values.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory or optical media storage). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video decoding, the method comprising:
obtaining local illumination compensation (LIC) information;
selecting a first LIC parameter set for a first coding block based on the LIC information; and
decoding the first coding block based on the determined LIC parameter set.

2. The method of claim 1, wherein the LIC information comprises an LIC parameter candidate list and an LIC parameter index associated with the LIC parameter candidate list, wherein the first LIC parameter set is selected from the LIC parameter candidate list based on the LIC parameter index.

3. The method of claim 1, wherein the LIC information comprises an LIC parameter candidate list, and the method further comprises:
obtaining, for the first coding block, an LIC parameter index associated with the LIC parameter candidate list, wherein the first LIC parameter set is further selected based on the LIC parameter index and the LIC parameter candidate list.

4. The method of claim 1, wherein the LIC information comprises an LIC parameter candidate list, and the method further comprises:
- selecting a third LIC parameter set, for a second coding block, from the LIC parameter candidate list based on the LIC parameter candidate list;
- decoding the second coding block based on the selected third LIC parameter set.

5. The method of claim 4, wherein the third LIC parameter set is the second LIC parameter set.

6. The method of claim 1, wherein the LIC information comprises an LIC parameter candidate list, and the method further comprises:
- obtaining a reconstructed sub-block of the first coding block;
- determining a second LIC parameter set based on the reconstructed sub-block of the first coding block; and
- adding the second LIC parameter set to the LIC parameter candidate list.

7. The method of claim 6, wherein the LIC information further comprises an LIC parameter index associated with the LIC candidate list, wherein the reconstructed sub-block of the first coding block is a right-hand vertical sub-block of the first coding block, and wherein the second LIC parameter set is indexed in the LIC parameter candidate list as a function of a vertical position associated with the sub-block of the first coding block.

8. The method of claim 6, wherein the LIC information further comprises an LIC parameter index associated with the LIC candidate list, wherein the reconstructed sub-block is a lower horizontal sub-block of the first coding block, and wherein the second LIC parameter set is indexed in the LIC parameter candidate list as a function of a horizontal position associated with the sub-block of the first coding block.

9. The method of claim 6, wherein determining the second LIC parameter set further comprises:
- determining a vertical LIC parameter set based on a right-hand vertical sub-block of the first coding block; and
- determining a horizontal LIC parameter set based on a lower-horizontal sub-block of the first coding block, wherein the vertical LIC parameter set is indexed in the LIC parameter candidate list as a function of a vertical position of the sub-block associated with the right-hand vertical sub-block of the first coding block, and wherein the horizontal LIC parameter set is indexed in the LIC parameter candidate list as a function of a horizontal position associated with the lower-horizontal sub-block of the first coding block.

10. The method of claim 1, wherein the method further comprises:
- receiving an indication to perform LIC on the first coding block.

11. A method for video encoding, the method comprising:
- obtaining local illumination compensation (LIC) information;
- selecting an LIC parameter set for a first coding block based on the LIC information; and
- encoding the first coding block based on the selected LIC parameter set; and
- including in video data, an indication of an index of the first LIC parameter set for the first coding block.

12. The method of claim 11, wherein the LIC information comprises an LIC parameter candidate list and an LIC parameter index associated with the LIC parameter candidate list, wherein the first LIC parameter set is selected from the LIC parameter candidate list based on the LIC parameter index.

13. The method of claim 11, wherein the LIC information comprises an LIC parameter candidate list, and the method further comprises:
- obtaining, for the first coding block, an LIC parameter index associated with the LIC parameter candidate list, wherein the first LIC parameter set is further selected based on the LIC parameter index and the LIC parameter candidate list.

14. The method of claim 11, wherein the LIC information comprises an LIC parameter candidate list, and wherein the method further comprises:
- selecting a third LIC parameter set, for a second coding block, from the LIC parameter candidate list based on the LIC parameter candidate list;
- encoding a second coding block based on the third LIC parameter set; and
- including, in video data, an index of the third LIC parameter set for the second coding block.

15. The method of claim 14, wherein the third LIC parameter set is the second LIC parameter set.

16. The method of claim 11, wherein the LIC information comprises an LIC parameter candidate list, and the method further comprises:
- obtaining a reconstructed sub-block of the first block;
- determining a second LIC parameter set based on the reconstructed sub-block of the first block;
- adding the second LIC parameter set to the LIC parameter candidate list; and
- including, in video data, an indication of an index of the second LIC parameter set.

17. The method of claim 16, wherein the LIC information comprises an LIC parameter candidate list, wherein the reconstructed sub-block of the first block is a right-hand vertical sub-block of the first coding block, and wherein the second LIC parameter set is indexed in the LIC parameter candidate list as a function of a vertical position associated with the sub-block of the first coding block.

18. The method of claim 16, wherein the LIC information comprises an LIC parameter candidate list, wherein the reconstructed sub-block of the first block is a lower horizontal sub-block of the first coding block, and wherein the second LIC parameter set is indexed in the LIC parameter candidate list as a function of a horizontal position associated with the sub-block of the first coding block.

19. The method of claim 16, wherein determining the second LIC parameter set further comprises:
- determining a vertical LIC parameter set based on a right-have vertical sub-block of the first block; and
- determining a horizontal LIC parameter set based on a lower-horizontal sub-block of the first coding block, wherein the vertical LIC parameter set is indexed in the LIC parameter candidate list as a function of a vertical position of the sub-block associated with the right-hand vertical sub-block of the first coding block, and wherein the horizontal LIC parameter set is indexed in the LIC parameter candidate list as a function of a horizontal position associated with the lower-horizontal sub-block of the first coding block.

20. An apparatus for video decoding, the apparatus comprising a processor configured to:
- obtain local illumination compensation (LIC) information;
- select a first LIC parameter set for a first coding block based on the LIC information; and decode the first coding block based on the determined LIC parameter set.

21. The apparatus of claim 20, wherein the LIC information comprises an LIC parameter candidate list and an LIC parameter index associated with the LIC parameter candidate list, wherein the first LIC parameter set is selected from the LIC parameter candidate list based on the LIC parameter index.

22. The apparatus of claim 20, wherein the LIC information comprises an LIC parameter candidate list, and the processor is further configured to:
  obtain, for the first coding block, an LIC parameter index associated with the LIC parameter candidate list, wherein the first LIC parameter set is further selected based on the LIC parameter index and the LIC parameter candidate list.

23. The method of claim 20, wherein the LIC information comprises an LIC parameter candidate list, and the processor is further configured to:
  select a third LIC parameter set, for a second coding block, from the LIC parameter candidate list based on the LIC parameter candidate list;
  decode the second coding block based on the selected third LIC parameter set.

24. The method of claim 23, wherein the third LIC parameter set is the second LIC parameter set.

25. The method of claim 20, wherein the LIC information comprises an LIC parameter candidate list, and the processor is further configured to:
  obtain a reconstructed sub-block of the first coding block;
  determine a second LIC parameter set based on the reconstructed sub-block of the first coding block; and
  add the second LIC parameter set to the LIC parameter candidate list.

26. The method of claim 25, wherein the LIC information further comprises an LIC parameter index associated with the LIC candidate list, wherein the reconstructed sub-block of the first coding block is a right-hand vertical sub-block of the first coding block, and wherein the second LIC parameter set is indexed in the LIC parameter candidate list as a function of a vertical position associated with the sub-block of the first coding block.

27. The method of claim 25, wherein the LIC information further comprises an LIC parameter index associated with the LIC candidate list, wherein the reconstructed sub-block is a lower horizontal sub-block of the first coding block, and wherein the second LIC parameter set is indexed in the LIC parameter candidate list as a function of a horizontal position associated with the sub-block of the first coding block.

28. The method of claim 25, wherein determining the second LIC parameter set further comprises:
  determining a vertical LIC parameter set based on a right-hand vertical sub-block of the first coding block; and
  determining a horizontal LIC parameter set based on a lower-horizontal sub-block of the first coding block, wherein the vertical LIC parameter set is indexed in the LIC parameter candidate list as a function of a vertical position of the sub-block associated with the right-hand vertical sub-block of the first coding block, and wherein the horizontal LIC parameter set is indexed in the LIC parameter candidate list as a function of a horizontal position associated with the lower-horizontal sub-block of the first coding block.

29. The method of claim 20, wherein the processor is further configured to:

receive an indication to perform LIC on the first coding block.

30. An apparatus for video encoding, the apparatus comprising a processor configured to:
  obtain local illumination compensation (LIC) information;
  select an LIC parameter set for a first coding block based on the LIC information; and
  encode the first coding block based on the selected LIC parameter set; and
  include in video data, an indication of an index of the first LIC parameter set for the first coding block.

31. The method of claim 30, wherein the LIC information comprises an LIC parameter candidate list and an LIC parameter index associated with the LIC parameter candidate list, wherein the first LIC parameter set is selected from the LIC parameter candidate list based on the LIC parameter index.

32. The method of claim 30, wherein the LIC information comprises an LIC parameter candidate list, and the processor is further configured to:
  obtain, for the first coding block, an LIC parameter index associated with the LIC parameter candidate list, wherein the first LIC parameter set is further selected based on the LIC parameter index and the LIC parameter candidate list.

33. The method of claim 30, wherein the LIC information comprises an LIC parameter candidate list, and wherein the processor is further configured to:
  select a third LIC parameter set, for a second coding block, from the LIC parameter candidate list based on the LIC parameter candidate list;
  encode a second coding block based on the third LIC parameter set; and
  including, in video data, an index of the third LIC parameter set for the second coding block.

34. The method of claim 33, wherein the third LIC parameter set is the second LIC parameter set.

35. The method of claim 30, wherein the LIC information comprises an LIC parameter candidate list, and the processor is further configured to:
  obtain a reconstructed sub-block of the first block;
  determine a second LIC parameter set based on the reconstructed sub-block of the first block;
  add the second LIC parameter set to the LIC parameter candidate list; and
  include, in video data, an indication of an index of the second LIC parameter set.

36. The method of claim 33, wherein the LIC information comprises an LIC parameter candidate list, wherein the reconstructed sub-block of the first block is a right-hand vertical sub-block of the first coding block, and wherein the second LIC parameter set is indexed in the LIC parameter candidate list as a function of a vertical position associated with the sub-block of the first coding block.

37. The method of claim 33, wherein the LIC information comprises an LIC parameter candidate list, wherein the reconstructed sub-block of the first block is a lower horizontal sub-block of the first coding block, and wherein the second LIC parameter set is indexed in the LIC parameter candidate list as a function of a horizontal position associated with the sub-block of the first coding block.

38. The method of claim 33, wherein determining the second LIC parameter set further comprises:
  determining a vertical LIC parameter set based on a right-have vertical sub-block of the first block; and determining a horizontal LIC parameter set based on a lower-horizontal sub-block of the first coding block, wherein the vertical LIC parameter set is indexed in the LIC parameter candidate list as a function of a vertical position of the sub-block associated with the right-hand vertical sub-block of the first coding block, and wherein the horizontal LIC parameter set is indexed in the LIC parameter candidate list as a function of a horizontal position associated with the lower-horizontal sub-block of the first coding block.

* * * * *